United States Patent
Jaskiewicz et al.

(10) Patent No.: US 10,685,006 B2
(45) Date of Patent: Jun. 16, 2020

(54) CONTENT MANAGEMENT SYSTEM AND METHOD FOR SYNCHRONIZING CONTENT TRANSLATIONS

(71) Applicant: Open Text SA ULC, Halifax (CA)

(72) Inventors: Michael Gerard Jaskiewicz, Urbandale, IA (US); David Alan Stiles, Fort Worth, TX (US)

(73) Assignee: OPEN TEXT SA ULC, Halifax (CA)

( * ) Notice: Subject to any disclaimer, the term of this patent is extended or adjusted under 35 U.S.C. 154(b) by 0 days.

(21) Appl. No.: 15/789,698

(22) Filed: Oct. 20, 2017

(65) Prior Publication Data
US 2018/0113860 A1  Apr. 26, 2018

Related U.S. Application Data

(60) Provisional application No. 62/411,373, filed on Oct. 21, 2016, provisional application No. 62/411,372, filed on Oct. 21, 2016.

(51) Int. Cl.
| | |
|---|---|
| *G06F 17/28* | (2006.01) |
| *G06F 16/22* | (2019.01) |
| *G06F 16/21* | (2019.01) |
| *G06F 40/55* | (2020.01) |
| *G06F 40/166* | (2020.01) |

(52) U.S. Cl.
CPC .......... *G06F 16/2272* (2019.01); *G06F 16/21* (2019.01); *G06F 40/166* (2020.01); *G06F 40/55* (2020.01)

(58) Field of Classification Search
CPC ............... G06F 17/24; G06F 17/30336; G06F 17/30289; G06F 17/2872; G06F 16/21; G06F 16/2272; G06F 40/55; G06F 40/166
See application file for complete search history.

(56) References Cited

U.S. PATENT DOCUMENTS

| | | | | |
|---|---|---|---|---|
| 5,903,902 | A | 5/1999 | Orr | |
| 5,956,737 | A | 9/1999 | King | |
| 6,161,114 | A | 12/2000 | King | |
| 7,027,973 | B2 * | 4/2006 | Macklin | G06F 17/2264 704/2 |
| 7,596,777 | B2 * | 9/2009 | Fallen-Bailey | G06F 9/526 704/5 |
| 7,996,417 | B2 * | 8/2011 | Travieso | G06F 40/44 707/761 |
| 8,386,235 | B2 * | 2/2013 | Duan | G06F 17/28 704/2 |
| 8,577,908 | B2 * | 11/2013 | Dettinger | G06F 16/2343 707/760 |

(Continued)

OTHER PUBLICATIONS

Notice of Allowance for U.S. Appl. No. 15/789,690, dated Dec. 11, 2019, 7 pgs.

(Continued)

*Primary Examiner* — Maikhanh Nguyen
(74) *Attorney, Agent, or Firm* — Sprinkle IP Law Group

(57) ABSTRACT

A content management system is provided that synchronizes translations between content items using labels. Labels can be persisted in the system as managed objects separate from content objects. Because the labels may be separate managed objects from the content, the labels can be implemented in a manner that does not change the content items or disrupt the lifecycle of the content.

24 Claims, 39 Drawing Sheets

(56) References Cited

U.S. PATENT DOCUMENTS

| | | | |
|---|---|---|---|
| 8,819,048 B1* | 8/2014 | Abnous | G06F 16/256 707/762 |
| 8,850,362 B1* | 9/2014 | Khoshnevisan | G06F 16/951 715/853 |
| 9,164,988 B2* | 10/2015 | Blodgett | G06F 17/289 |
| 9,519,642 B2 | 12/2016 | Johnson, III et al. | |
| 9,906,615 B1 | 2/2018 | Jaskiewicz et al. | |
| 10,248,653 B2* | 4/2019 | Blassin | G06Q 10/06311 |
| 2002/0002452 A1* | 1/2002 | Christy | G06F 17/2872 704/3 |
| 2002/0046235 A1 | 4/2002 | Foy | |
| 2002/0123878 A1* | 9/2002 | Menke | G06F 17/2229 704/2 |
| 2003/0014237 A1* | 1/2003 | Macklin | G06F 17/2264 704/2 |
| 2003/0079177 A1 | 4/2003 | Brintzenhofe | |
| 2003/0140316 A1* | 7/2003 | Lakritz | G06F 17/2258 715/201 |
| 2003/0191817 A1* | 10/2003 | Fidler | G06F 17/243 709/219 |
| 2004/0044518 A1* | 3/2004 | Reed, Jr. | G06F 16/9577 704/8 |
| 2004/0186825 A1* | 9/2004 | Dettinger | G06F 16/2343 |
| 2005/0223320 A1 | 10/2005 | Brintzenhofe | |
| 2007/0180143 A1* | 8/2007 | Greeff | G06F 40/58 709/246 |
| 2007/0226687 A1* | 9/2007 | Fallen-Bailey | G06F 9/526 717/110 |
| 2009/0132508 A1 | 5/2009 | Skowronek | |
| 2011/0288851 A1* | 11/2011 | Duan | G06F 17/24 704/3 |
| 2012/0330644 A1* | 12/2012 | Giraudy | G06F 17/289 704/3 |
| 2013/0031166 A1* | 1/2013 | Jayaraman | G06F 40/58 709/203 |
| 2013/0066833 A1 | 3/2013 | Aikas | |
| 2013/0262078 A1* | 10/2013 | Gleadall | G06F 40/40 704/3 |
| 2013/0282360 A1* | 10/2013 | Shimota | G06F 17/28 704/7 |
| 2014/0244236 A1* | 8/2014 | Johnson, III | G06F 17/289 704/2 |
| 2015/0161227 A1* | 6/2015 | Buryak | G06F 9/454 707/738 |
| 2016/0162478 A1* | 6/2016 | Blassin | G06Q 10/06311 |
| 2016/0232184 A1 | 8/2016 | Wilder | |
| 2017/0068663 A1* | 3/2017 | Johnson, III | G06F 17/289 |
| 2018/0113891 A1 | 4/2018 | Jaskiewicz et al. | |

OTHER PUBLICATIONS

Notice of Allowance for U.S. Appl. No. 15/789,690, dated Jan. 27, 2020, 7 pgs.

* cited by examiner

260

| labelID: 2000 |
|---|
| NAME: PUBLIC |
| parentlabelID: <NULL> |
| DESCRIPTION: <STRING> |
| MEMBERSHIP: <NULL> |
| PROTECTED: N |
| OWNER RESTRICTED: N |
| PUBLISHABLE: ALWAYS |
| REQUIRED ASPECTS: <NULL> |

265

| labelID: 2001 |
|---|
| NAME: INTERNAL |
| parentlabelID: <NULL> |
| DESCRIPTION: <STRING> |
| MEMBERSHIP: <NULL> |
| PROTECTED: N |
| OWNER RESTRICTED: N |
| PUBLISHABLE: NEVER |
| REQUIRED ASPECTS: <NULL> |

270

| labelID: 2002 |
|---|
| NAME: PERSONAL |
| parentlabelID: <NULL> |
| DESCRIPTION: <STRING> |
| MEMBERSHIP: <NULL> |
| PROTECTED: N |
| OWNER RESTRICTED: Y |
| PUBLISHABLE: NEVER |
| REQUIRED ASPECTS: LabelAccess |

275

| labelID: 2003 |
|---|
| NAME: SYSTEM |
| parentlabelID: <NULL> |
| DESCRIPTION: <STRING> |
| MEMBERSHIP: <NULL> |
| PROTECTED: Y |
| OWNER RESTRICTED: N |
| PUBLISHABLE: LabelDefined |
| REQUIRED ASPECTS: <NULL> |

| labelID: 1000 |
|---|
| NAME: PANTS |
| parentlabelID: 2000 |
| DESCRIPTION: <STRING> |
| MEMBERSHIP: 0006 0008 |
| ∘ ∘ ∘ |

Label: Tools On Sale | Last Saved at 6/30/16 6:25:03 PM CDT

Properties — 424

General | Languages — 422

Name *
Tools On Sale

Parent Lead
/Internal
Select...

Description

* Required

Save | Save & Close

Bulk Set Publish Date

This action will be performed on all items with the label "Enterprise World Sample".

Process Name

Bulk Set Publish Date-2016-07-04 17:15:57

Description

Publish Date
Select new scheduled publish date, or clear for none.

America/Chicago

[ Clear ]

Unpublish Date
Select new scheduled unpublish date, or clear for none.

America/Chicago

[ Clear ]

[ Settings ▽ ]

[ Cancel ]

[ Start ]

| NESTED CLASSES | | |
|---|---|---|
| TYPE | NAME | DESCRIPTION |
| static interface | ObjectLabel.Formatter | FORMATTER DEFINES THE INTERFACE WITH OPTIONS FOR FORMATTING LABEL PATHS (e.g., A BREADCRUMB STRINGS) |
| static class | ObjectLabel.StandardFormatter | StandardFormatter PROVIDES A STANDARD FORMATTER IMPLEMENTATION WITH DEFAULT OPTIONS |
| static class | ObjectLabel.StandardSuggester | StandardSuggester PROVIDES A STANDARD ObjectLabel.Suggester IMPLEMENTATION WITH DEFAULT OPTIONS |
| static interface | ObjectLabel.Suggester | SUGGESTER DEFINES THE INTERFACE WITH FORMATTER OPTIONS USED FOR OBTAINING LABEL AUTO-SUGGESTIONS |
| static class | ObjectLabel.Suggestion | SUGGESTION DEFINES A LABEL SUGGESTION |

FIG. 11B

| FIELDS | | |
|---|---|---|
| TYPE | NAME | DESCRIPTION |
| private ObjectLabelData | data | |
| static int | NAME_MAXIMUM | A CONSTANT REPRESENTING THE MAXIMUM LENGTH OF AN OBJECT LABEL NAME OR LOCALIZED NAME |
| private static long | serialVersionUID | |
| private java.util.List<ObjectLabelRef> | subLabelRefs | |

FIG. 11C

| CONSTRUCTOR | |
|---|---|
| NAME | DESCRIPTION |
| ObjectLabel () | CONSTRUCTOR INVOKED TO CREATE OBJECTS FROM THE ObjectLabel CLASS |

FIG. 11D

| METHODS | | |
|---|---|---|
| | METHOD | DESCRIPTION |
| <T extends ObjectLabelAspect> T | addAspect (java.lang.class<T> aspectClass) | ADDS A SPECIFIED ASPECT TO THE ObjectLabel |
| static java.util.List<ManagedObjectVCMRef> | expandLabels (java.util.List<ManagedObjectVCMRef> ids) | RETURN A LIST OF IDs WITH ALL ObjectLabel IDS REPLACED BY THEIR EFFECTIVE MEMBER IDs. THIS CONVENIENCE METHOD APPLIES GetEffectiveMemberIds () TO ANY OBJECT LABELS THAT MAY APPEAR IN AN ARBITRARY LIST OF OBJECT IDs |
| static ObjectLabel | findByContentManagementID (ManagedObjectVCMRef ref) | FINDS A SINGLE ObjectLabel USING A SPECIFIED ManagedObjectVCMRef |
| static ObjectLabel | findByContentManagementID (ManagedObjectVCMRef ref, RequestParameters params) | FINDS A SINGLE OBJECTLABEL USING A SPECIFIED ManagedObjectVCMRef. INCLUDES PARAMETERS FOR THE FINDER TO USE |
| static ObjectLabel | findByID (ObjectLabelRef ref) | FINDS A SINGLE ObjectLabel USING A SPECIFIED ObjectLabelRef |
| static ObjectLabel | findByID (ObjectLabelRef ref, RequestParameters params) | FINDS A SINGLE ObjectLabel USING A SPECIFIED ObjectLabelRef. INCLUDES PARAMETERS FOR THE FINDER TO USE |
| static java.util.List<ObjectLabel> | findDomainObjectLabels (RequestParameters params) | RETURNS ALL DOMAIN ObjectLabel INSTANCES GIVEN AN OPTIONAL SET OF REQUEST PARAMETERS |

FIG. 11E

METHODS

| | METHOD | DESCRIPTION |
|---|---|---|
| static java.util.List<ObjectLabel> | findDomainObjectLabels (RequestParameters params, ObjectLabelDomainRequestParameters domainParams) | RETURNS ALL DOMAIN ObjectLabel INSTANCES GIVEN AN OPTIONAL SET OF REQUEST PARAMETERS AND AN OPTIONAL SET OF REQUEST PARAMETERS. THE SET OF DOMAIN ObjectLabels INSTANCES RETURNED IS BASED ON THE SETTING SPECIFIED IN THE ObjectLabelDomainRequest Parameters domainParams PARAMETER. IF THE VALUE SPECIFIED FOR domainParams IS NULL THEN ALL DOMAIN ObjectLabel INSTANCES WILL BE RETURNED |
| static java.util.List<ObjectLabel> | findObjectLabels (java.util.List<ManagedObjectVCMRef> movrs, RequestParameters params, ObjectLabelRequestParameters labelParams) | RETURNS A LIST OF ObjectLabel INSTANCES THAT A SPECIFIED LIST OF ManagedObjects ARE MEMBERS OF BASED ON SETTING SPECIFIED IN THE ObjectLabelRequestParameters labelParams PARAMETER. IF LABELPARAMS IS NULL, THEN ALL ObjectLabel INSTANCES THE ManagedObjects ARE MEMBERS OF WILL BE RETURNED |
| static java.util.List<ObjectLabel> | findObjectLabels (ManagedObjectVCMRef movrs, RequestParameters params, ObjectLabelRequestParameters labelParams) | RETURNS A LIST OF ObjectLabel INSTANCES THAT A SPECIFIED ManagedObject IS A MEMBER OF BASED ON SETTING SPECIFIED IN THE ObjectLabelRequestParameters labelParams PARAMETER. IF LABELPARAMS IS NULL, THEN ALL ObjectLabel INSTANCES THE ManagedObject IS A MEMBER OF WILL BE RETURNED |

FIG. 11F

METHODS

| METHOD | DESCRIPTION |
|---|---|
| static<br><T extends ObjectLabelAspect><br><u>java.util.List<ObjectLabel></u><br><u>findObsoleteObjectLabels</u>(java.lang.<br>Class<T> aspectClass,<br>RequestParameters params) | RETURNS A LIST OF OBSOLETE ObjectLabel INSTANCES THAT HAVE A SPECIFIED ASPECT. OBSOLETE ObjectLabels ARE THOSE THAT ARE NO LONGER NEEDED AND CAN BE DELETED. THE CONDITION OF BEING OBSOLETE IS DEFINED AND DETERMINED BY THE ASPECT. IF AN ObjectLabel RETURNED ALSO HAVE OTHER ASPECTS, THE ObjectLabel MAY NOT BE OBSOLETE FOR ALL ASPECTS. IN ORDER TO DETERMINE IF AN ObjectLabel IS COMPLETELY OBSOLETE, THE CALLER CAN BE CONFIGURED TO CHECK IF THE ObjectLabel IS RETURNED BY THE METHOD WHEN SPECIFYING EACH OF THE OTHER ASPECTS |
| protected<br>java.util.List<<u>TackedProp</u>> <u>getApprovalRequiredProperties</u>() | RETURNS A LIST OF ITrackedProp OBJECTS REPRESENTING THE PROPERTIES THAT REQUIRE APPROVAL IF MODIFIED |
| <T extends<br>ObjectLabelAspect> <u>getAsAspect</u> (java.lang.Class<T><br>aspectClass) | GETS THE ObjectLabel AS AN INSTANCE OF A SPECIFIED ASPECT |
| T java.util.List<java.lang.Class<<br>? extends ObjectLabelAspect>> <u>getAspectClasses</u> () | RETURNS A LIST OF JAVA CLASSES FOR THE ASPECTS ASSIGNED TO THE ObjectLabel |
| protected boolean <u>getChangeTrackingDefault</u> () | RETURNS A FLAG INDICATED WHETHER OR NOT THE MANAGED OBJECT SUPPORTS CHANGE TRACKING, WHICH DETERMINES WHETHER OR NOT CHANGE TRACKING GETS ENABLED FOR THE MANAGED OBJECT |

FIG. 11G

METHODS

| | METHOD | DESCRIPTION |
|---|---|---|
| (package private) IDALogic | getDALogic () | GETS THE IDALogic OBJECT WHICH PERFORMS COMMON DELEGATED ADMINISTRATION (DA) FUNCTIONS SUCH AS DETERMINING INHERITED DA AUTHORIZED GROUPS AND PROPERLY SEEDING NEW ACCESS CONTROL LISTS (ACLs) FOR THE THIS ObjectLabel |
| ObjectLabelData | getData () | GETS THE ObjectLabelData OBJECT FOR THIS ObjectLabel |
| protected java.lang.Class | getDataObjectClass () | GETS THE CLASS SPECIFYING THE TYPE OF THE CONTAINED DATA OBJECT |
| static java.util.List<ObjectLabelRef> | getDomainObjectLabelRefs (ObjectLabelDomainRequestParameters domainParams) | RETURNS A LIST DOMAIN ObjectLabel REFERENCES. THE SET OF DOMAIN ObjectLabel REFERENCED RETURNED IS BASED ON THE SETTING SPECIFIED IN THE ObjectLabelDomainRequest Parameters domainParams PARAMETER. IF THE VALUE SPECIFIED FOR DomainParams IS NULL THEN ALL DOMAIN ObjectLabel REFERENCES WILL BE RETURNED |
| Public java.util.List<ManagedObject VCMRef> | getEffectiveMemberIds () | RETURNS A LIST OF IDS FOR THE MEMBERS OF THIS ObjectLabel, AS WELL AS ANY MEMBERS OF NESTED ObjectLabels. ANY MEMBER OF THIS LABEL WHICH HAPPENS ALSO TO BE A LABEL WILL BE EXPANDED INTO ITS MEMBERS, WHICH ARE THEN RETURNED IN ITS PLACE. THIS BEHAVIOR APPLIES RECURSIVELY TO ALL NESTED LABELS. IF ANY NON-LABEL MEMBER IS DUPLICATED AMONG NESTED LABELS, ONLY ONE INSTANCE OF THAT MEMBER IS RETURNED |

FIG. 11H

METHODS

| | METHOD | DESCRIPTION |
|---|---|---|
| private java.util.Set<ManagedObjectVCMRef> | getEffectiveMemberIds (ManagedObjectVCMRef labelId, java.util.List< ManagedObjectVCMRef> visited) | GETS THE RECURSIVE, NON-LABEL MEMBERS OF A GIVEN LABEL. LabelID IS THE LABEL AND VISITED IS A LIST OF LABELS VISITED FOR PURPOSE OF CYCLE DETECTION |
| static ObjectLabel.Formatter | getFormatter () | GET A STANDARD FORMATTER |
| private static IDObjectLabelOps | getLocalOps () | RETURNS THE IMPLEMENTATION OF THE IObjectLabelOps INTERFACE |
| protected java.lang.Class | getLogicInterface () | RETURNS THE RUNTIME CLASS OF THE ILabelOps INTERFACE |
| ObjectLabelRef | getManagedObject Ref () | GETS A REFERENCE TO THE CURRENT ObjectLabel AS AN ObjectLabelRef. NULL IF OBJECT HAS NOT BEEN SAVED, INDICATING A NEW OBJECT |
| boolean | getMultilingual() | RETURNS A FLAG INDICATING WHETHER THE ObjectLabel IS MULTILINGUAL ENABLED OR NOT. DEPENDS ON LOCALIZED DATA DEFINED ON THIS ObjectLabel |
| java.lang.String | getName() | GETS THE NAME FOR THIS ObjectLabel |
| java.lang.String | getName(AsLocalRef locale) | RETURNS A LOCALIZED NAME OF THE ObjectLabel FOR A SPECIFIED LOCALE. IF THE ObjectLabel DOES NOT HAVE A LOCALE ASSIGNED, OR IF THE NAME HAS NOT BEEN LOCALIZED FOR THE SPECIFIED LOCALE, THEN THE PRIMARY ObjectLabel NAME CAN BE RETURNED (i.e., THE VALUE RETURNED BY getName ()) |

FIG. 11I

METHODS

| METHOD | DESCRIPTION |
|---|---|
| static java.util.List <ObjectLabelDomain> getObjectLabelDomains (ObjectLabelDomainRequestParameters domainParams) | RETURNS A LIST OF ObjectLabelDomain INSTANCES. THE SET OF ObjectLabelDomain INSTANCES RETURNED IS BASED ON THE SETTING SPECIFIED IN THE ObjectLabelDomainRequest PARAMETERS DomainParams PARAMETER. IF THE VALUE SPECIFIED FOR DomainParams IS NULL THEN ALL DOMAIN ObjectLabelDomain INSTANCES WILL BE RETURNED |
| static java.util.List <ObjectLabelRef> getObjectLabelRefs (java.util.List<ManagedObjectVCM Ref> movrs, RequestParameters params, ObjectLabelRequestParameters labelParams) | RETURNS A LIST OF REFERENCES TO ObjectLabel INSTANCES THAT A SPECIFIED LIST OF ManagedObjects ARE MEMBERS OF BASED ON SETTINGS SPECIFIED IN THE ObjectLabelRequestParameters labelParams PARAMETER. IF labelParams IS NULL, THEN THE REFERENCES TO ALL ObjectLabel INSTANCES THE ManagedObjects ARE MEMBERS OF WILL BE RETURNED |
| static java.util.List <ObjectLabelRef> getObjectLabelRefs (<ManagedObjectVCMRef> movrs, RequestParameters params, ObjectLabelRequestParameters labelParams) | RETURNS A LIST OF REFERENCES TO ObjectLabel INSTANCES THAT A SPECIFIED ManagedObject IS A MEMBER OF BASED ON SETTING SPECIFIED IN THE ObjectLabelRequestParameters labelParams PARAMETER. IF LABELPARAMS IS NULL, THEN THE REFERENCES TO ALL ObjectLabel INSTANCES THE ManagedObjects ARE MEMBERS OF WILL BE RETURNED |
| ObjectTypeRef getObjectTypeRef () | GETS A REFERENCE TO THE ObjectLabel ObjectType |

FIG. 11J

METHODS

| METHOD | | DESCRIPTION |
|---|---|---|
| static <T extends ObjectLabelAspect> java.util.List<ObjectLabelRef> | getObsoleteObjectLabelRefs(java.lang.Class<T> aspectClass) | RETURNS A LIST OF REFERENCES TO OBSOLETE ObjectLabel INSTANCES THAT HAVE A SPECIFIED ASPECT. OBSOLETE ObjectLabels ARE THOSE THAT ARE NO LONGER NEEDED AND CAN BE DELETED. THE CONDITION OF BEING OBSOLETE IS DEFINED AND DETERMINED BY THE ASPECT. IF AN ObjectLabel RETURNED ALSO HAVE OTHER ASPECTS, THE ObjectLabel MAY NOT BE OBSOLETE FOR ALL ASPECTS. IN ORDER TO DETERMINE IF AN ObjectLabel IS COMPLETELY OBSOLETE, THE CALLER CAN BE CONFIGURED TO CHECK IF THE ObjectLabel IS RETURNED BY THE METHOD WHEN SPECIFYING EACH OF THE OTHER ASPECTS |
| java.util.List<ObjectLabelRef> | getPath () | RETURNS THE FULLY QUALIFIED PATH FOR THIS ObjectLabel AS A LIST OF IDS ORDERED FROM DOMAIN TO THIS ObjectLabel, INCLUSIVE |
| AttributeData [ ] | getPrimaryKeys () | GETS AN ARRAY OF PRIMARY KEYS |
| java.util.List<ObjectLabelRef> | getSubObjectLabelRefs () | RETURNS A LIST OF REFERENCES FOR ALL IMMEDIATE CHILD ObjectLabels OF THIS ObjectLabel. ONCE FETCHED AN INITIAL TIME, THE CHILD ObjectLabel REFERENCES MAY BE CACHED ON THIS ObjectLabel, BUT CAN BECOME STALE. refreshSubObjectLabelRefs () CAN BE CALLED TO REFRESH CHILD ObjectLabel REFERENCES |

FIG. 11K

| | METHODS | |
|---|---|---|
| | METHOD | DESCRIPTION |
| private java.util.List <ObjectLabelRef> | getSubObjectLabelRefs (Boolean refreshFromDB) | RETURNS A LIST OF REFERENCES FOR ALL IMMEDIATE CHILD ObjectLabels OF THIS ObjectLabel. IF refreshFromDB IS SET TO TRUE, THE LIST OF SUB-LABEL REFERENCES IS RELOADED FROM THE DATABASE INSTEAD OF RETURNING THE LIST ALREADY CACHED ON THIS ObjectLabel OBJECT. IF FALSE THEN THE LIST OF REFERENCES ALREADY CACHED ON THIS ObjectLabel IS RETURNED. EVEN IF SET TO FALSE, HOWEVER, IF THE SUB-LABEL REFERENCES HAVE NOT BEEN PREVIOUSLY LOADED FROM THE DATABASE, THEN THEY WILL BE |
| java.util.List <ObjectLabel> | getSubObjectLabel (RequestParameters params) | RETURNS A LIST OF ALL IMMEDIATE CHILD ObjectLabels OF ITS ObjectLabel |
| static ObjectLabel.Suggester | getSuggester () | GET A STANDARD SUGGESTER |
| java.util.List <ObjectLabelRef> | getTree () | RETURNS ALL LABELS ROOTED BY THIS ObjectLabel, INCLUSIVE |
| static ObjectTypeRef | getTypeObjectTypeRef () | GETS A REFERENCE TO THE ObjectLabel ObjectType |
| protected java.util.List <ITrackedProp> | getWorkflowRequiredProperties () | RETURNS A LIST OF THE ITrackedProp OBJECTS REPRESENTING THE PROPERTIES THAT REQUIRE WORKFLOW IF MODIFIED |
| <T extends ObjectLabelAspect> boolean | hasAspect (java.lang.Class<T> aspectClass) | DETERMINES IF ObjectLabel CURRENTLY HAS A SPECIFIED ASPECT |
| boolean | HasAspectDataChanges () | METHOD USED TO DETERMINE IF ASPECT DATA HAS BEEN MODIFIED ON THIS OBJECT |
| boolean | HasLocalizedDataChanges () | METHOD USED TO DETERMINE IF LOCALIZED DATA HAS BEEN MODIFIED ON THIS OBJECT |

FIG. 11L

| | METHODS | |
|---|---|---|
| | METHOD | DESCRIPTION |
| boolean | HasMemberDataChanges () | METHOD USED TO DETERMINE IF MEMBER DATA HAS BEEN MODIFIED ON THIS OBJECT |
| boolean | HasPropertyDataChanges () | METHOD USED TO DETERMINE IF PROPERTY DATA HAS BEEN MODIFIED ON THIS OBJECT |
| boolean | HasPublishableDataChanges () | METHOD USED TO DETERMINE IF ANY DATA RELATED TO THE ObjectLabel BEING PUBLISHABLE HAS BEEN MODIFIED BY THIS OBJECT. PUBLISHABLE DATA INCLUDES THE PUBLISHABLE SETTING AND MEMBER DATA |
| boolean | isDomainObjectLabel () | DETERMINES IF ObjectLabel IS A DOMAIN ObjectLabel. THIS CHECK MAY BE PERFORMED BASED ON THE STATE OF THE ObjectLabel's PARENT ObjectLabel |
| void | managestatus () | METHOD ENSURES THAT ObjectLabel OBJECTS ARE MARKED AS APPROVED |
| static ObjectLabel | newInstance () | CREATE A NEW INSTANCE OF THE CONCRETE OBJECT FOR THIS BASE TYPE. METHOD CREATES A NEW INSTANCE OF THE CONCRETE SUBCLASS FOR THE BASE TYPE. THE NEW INSTANCE IS CONSTRUCTED FROM THE CONFIGURED javaClassName FOR THE CORRESPONDING ObjectType |

FIG. 11M

| | METHODS | |
|---|---|---|
| | METHOD | DESCRIPTION |
| static ObjectLabel | newInstance (ObjectLabelDomain domain) | CREATE A NEW ObjectLabel INITIALIZED FOR A SPECIFIED ObjectLabel DOMAIN OR AS A NEW DOMAIN. THE NEW ObjectLabel IS INSTANTIATED BY newinstance () AND THEN FURTHER INITIALIZED BASED ON THE CONFIGURATION OF THE SPECIFIED ObjectLabel DOMAIN OR AS A NEW DOMAIN ObjectLabel, INCLUDING SETTING THE DOMAIN OF THE NEW ObjectLabel TO THE SPECIFIED DOMAIN AND ADDING ANY ASPECTS TO THE NEW ObjectLabel THAT ARE REQUIRED BY THE DOMAIN OR REQUIRED FOR A NEW DOMAIN ObjectLabel. WHEN INSTANTIATING A NEW ObjectLabel OF AN EXISTING DOMAIN THE PARENT ObjectLabel OF THE NEW ObjectLabel WILL BE INITIALIZED TO BE THE SPECIFIED DOMAIN ObjectLabel, BUT THIS CAN BE CHANGED AS NEEDED USING ObjectLabelData.SetParent Label (ObjectLabelRef). WHEN INSTANTIATING A NEW DOMAIN ObjectLabel, THE PARENT ObjectLabel WILL BE LEFT NULL AS IS REQUIRED IN ORDER TO BE A DOMAIN ObjectLabel |
| void | prepareToCache () | PREPARES THIS ManageObject TO BE CACHED |
| protected void | refresh (ManagedObject obj) | REFRESHES THIS OBJECT WITH THE DATA OBJECT CONTAINED IN THE SPECIFIED MANAGED OBJECT |

FIG. 11N

| METHODS | | |
|---|---|---|
| | METHOD | DESCRIPTION |
| void | refreshSubObjectLabelRefs () | REFRESHES THE LIST OF CHILD ObjectLabel REFERENCES CACHED ON THIS ObjectLabel OBJECT. ONCE REFRESHED, THE CHILD ObjectLabel REFERENCES MAY BE ACCESSED THROUGH getSubObjectLabelRefs () |
| <T extends ObjectLabelAspect> boolean | removeAspect (java.lang.Class<T> aspectClass) | REMOVES A SPECIFIED ASPECT FROM THE ObjectLabel |
| void | setData (ObjectLabelData data) | SETS THE ObjectLabelData OBJECT FOR THIS ObjectLabel |
| <T extends ObjectLabelAspect> boolean | supportsAspect (java.lang.Class<T> aspectClass) | DETERMINES IF THE ObjectLabel SUPPORTS A SPECIFIED ASPECT |
| static void | setObjectLabelRefs (ManagedObjectVCMRef movr, java.util.List<ObjectLabelRef> labels, ObjectLabelRequestParameters labelParams) | SETS A SPECIFIED ManagedObject AS A MEMBER OF A LIST OF SPECIFIED ObjectLabel INSTANCES. IF THE ManagedObject IS NOT ALREADY A MEMBER OF A SPECIFIED ObjectLabel THEN IT WILL BE ADDED AS A MEMBER OF THE ObjectLabel. IF THE ManagedObject IS A ALREADY A MEMBER OF A SPECIFIED ObjectLabel THEN IT WILL NOT BE ADDED TO THAT ObjectLabel. IF THE ManagedObject IS A MEMBER OF OTHER ObjectLabel INSTANCES NOT SPECIFIED IN THE LIST, THEN IT WILL BE REMOVED FROM THOSE ObjectLabel INSTANCES. ManagedObjectVCMRef MOVR IS A REFERENCE TO THE ManagedObject TO BE SET AS A MEMBER OF THE SPECIFIED ObjectLabels. LABELS IS A LIST OF REFERENCE TO THE ObjectLabel INSTANCES TO WHICH THE ManagedObject IS TO BE MADE A MEMBER. labelParams: ObjectLabelRequest PARAMETERS USED TO CONTROL THE SET OF ObjectLabel INSTANCES THE ManagedObject IS MADE A MEMBER OF; CAN BE NULL TO TREAT THE SPECIFIED SET OF ObjectLabel REFERENCES AS THE FULL SET OF ObjectLabel INSTANCES THE ManagedObject IS A MEMBER OF |

FIG. 12A

NESTED CLASSES

| TYPE | NAME | DESCRIPTION |
|---|---|---|
| class | ObjectLabelData.ObjectLabelAspectDataBridge | ObjectLabelAspectDataBridge IS CONFIGURED TO PROVIDE ACCESS TO LABEL ASPECT DATA WITHOUT REQUIRING THAT SUCH DATA BE EXPOSED THROUGH PUBLIC METHODS |

FIG. 12B

FIELDS

| TYPE | NAME | DESCRIPTION |
|---|---|---|
| private java.util.List<ObjectLabelAspectData> | aspectData | |
| private ObjectLabelData.ObjectLabelAspectData Bridge | aspectDataBridge | THE ASPECT DATA BRIDGE, WHICH IS USED TO PROTECT THE ObjectLabelData METHODS THAT MUTATE ASPECT DATA. THE ASPECT DATA BRIDGE CAN ONLY BE ACCESSED THROUGH REFLECTION, BUT IT DEFINES PUBLIC METHODS THAT CAN BE USED TO MANAGE ASPECT DATA WITHOUT REQUIRING THAT ASPECT DATA METHODS ON ObjectLabelData BE PUBLIC. THIS APPROACH CAN BE USED TO PROTECT AND LIMIT ACCESS ObjectLabelData's ASPECT DATA |
| private java.lang.String | description | |
| Private ObjectLabelRef | domainLabel | THE DOMAIN LABEL |
| static java.lang.String | Field_Aspect_Data_Bridge | THE NAME OF THE aspectDataBridge FIELD; THIS IS USED BY LOGIC EXTERNAL BY THE CLASS TO ACCESS THE aspectDataBridge FIELD THROUGH REFLECTION |
| static java.lang.String | Field_Aspect_Domain_Label | THE NAME OF THE domainLabel FIELD; THIS IS USED BY LOGIC EXTERNAL TO THE CLASS TO SET THE VALUE OF THE domainLabel THROUGH REFLECTION |

FIG. 12C

| FIELDS | | |
|---|---|---|
| TYPE | NAME | DESCRIPTION |
| static java.lang.String | Field_Object_Label_Ref | THE NAME OF THE objectLabelRef FIELD. THIS IS USED BY LOGIC EXTERNAL TO THE CLASS TO SET THE VALUE OF objectLabelRef THROUGH REFLECTION |
| static java.lang.String | Field_Parent_Label | THE NAME OF THE parentLabel FIELD. THIS IS USED BY LOGIC EXTERNAL TO THE CLASS TO SET THE VALUE OF parentLabel THROUGH REFLECTION |
| private java.util.List<ObjectLabelLocalizedData> | localizedData | |
| private java.util.List<ObjectLabelLocalizedData> | memberData | |
| private java.lang.String | name | |
| private ObjectLabelRef | ObjectLabelRef | THE LABEL ID |
| private java.util.List<ObjectLabelPropertyData> | propertydata | |
| private boolean | publishable | |

FIG. 12D

| CONSTRUCTOR | |
|---|---|
| NAME | DESCRIPTION |
| ObjectLabelData () | CONSTRUCTOR INVOKED TO CREATE OBJECTS FROM THE ObjectLabelData CLASS |

FIG. 12E

| METHODS | | |
|---|---|---|
| | METHOD | DESCRIPTION |
| private void | addAspectData (ObjectLabelAspectData aspectData) | ADDS AN ASPECT DATA ENTRY TO THE SET OF ASPECT DATA FOR THE OBJECT LABEL |
| void | addLocalizedData (ObjectLabelLocalizedData localizedData) | ADDS A LOCALIZED DATA ENTRY TO THE SET OF LOCALIZED DATA FOR THE ObjectLabel |
| void | addMember (ManagedObjectVCMRef member) | ADDS A MEMBER TO THE SET OF MEMBER DATA FOR THE ObjectLabel |
| void | addMemberdata (ObjectLabelMemberData memberData) | ADDS A MEMBER DATA ENTRY TO THE SET OF MEMBER DATA FOR THE ObjectLabel |
| void | addPropertyData (ObjectLabelPropertyData propertyData) | ADDS A PROPERTY DATA ENTRY TO THE SET OF PROPERTY DATA FOR THE ObjectLabel |
| private void | clearAspectData () | REMOVES ALL ASPECT DATA ENTRIES FROM THE ObjectLabel |
| void | clearLocalizedData () | REMOVES ALL LOCALIZED DATA ENTRIES FROM THE ObjectLabel |
| void | clearMemberData () | REMOVES ALL MEMBER DATA ENTRIES FROM THE ObjectLabel |
| void | clearPropertyData () | REMOVES ALL PROPERTY DATA ENTRIES FROM THE ObjectLabel |
| private ObjectLabelAspectData [] | getAspectData () | RETURNS THE SET OF ASPECT DATA FOR THE ObjectLabel |

FIG. 12F

| | METHOD | DESCRIPTION |
|---|---|---|
| METHODS | | |
| private ObjectLabelAspectData | getAspectData (java.lang.String name) | RETURNS THE SET OF ASPECT DATA FOR THE ObjectLabel AND ASPECT NAME |
| java.lang.String | getDescription () | RETURNS THE DESCRIPTION OF THE ObjectLabel INSTANCE |
| ObjectLabelRef | getDomainLabel () | RETURNS THE DOMAIN LABEL THE ObjectLabel INSTANCE |
| ObjectLabelLocalizedData [ ] | getLocalizedData () | RETURNS THE SET OF LOCALIZED DATA FOR THE ObjectLabel |
| ObjectLabelLocalizedData | getLocalizedData (AsLocaleRef locale) | RETURNS THE SET OF LOCALIZED DATA FOR THE ObjectLabel AND SPECIFIED LOCALE |
| ObjectLabelMemberData | getMemberData () | RETURNS THE SET OF MEMBER DATA FOR THE ObjectLabel. MEMBER DATA FOR MEMBER OBJECTS THAT ARE NOT AVAILABLE ON THE CURRENT STAGE WILL NOT BE RETURNED |

FIG. 12G

METHODS

| METHOD | DESCRIPTION |
|---|---|
| ObjectLabelMemberData [ ] getMemberData (boolean filterAvailable) | RETURNS THE SET OF MEMBER DATA FOR THE ObjectLabel. IF filterAvailable IS SET TO TRUE, METHOD RETURNS DATA ONLY FOR MEMBERS THAT ARE AVAILABLE ON THE CURRENT STAGE. IF SET TO FALSE, METHOD WILL RETURN ALL MEMBER DATA REGARDLESS OF MEMBERS BEING AVAILABLE ON THE CURRENT STAGE |
| ObjectLabelMemberData getMemberData (ManagedObjectVCMRef member) | RETURNS A MEMBER DATA ENTRY FROM THE SET OF MEMBER DATA FOR THE ObjectLabel AND SPECIFIED MEMBER. IF THE MEMBER OBJECT IS NOT AVAILABLE ON THE CURRENT STAGE THEN THE MEMBER DATA WILL NOT BE RETURNED |
| ObjectLabelMemberData getMemberData (ManagedObjectVCMRef member, Boolean filterAvailable) | RETURNS A MEMBER DATA ENTRY FROM THE SET OF MEMBER DATA FOR THE ObjectLabel AND SPECIFIED MEMBER. IF filterAvailable IS SET TO TRUE, METHOD RETURNS DATA ONLY FOR MEMBER THAT IS AVAILABLE ON THE CURRENT STAGE. IF SET TO FALSE, METHOD WILL RETURN MEMBER DATA REGARDLESS OF MEMBER BEING AVAILABLE ON THE CURRENT STAGE |
| java.util.List<ManagedObjectVCMRef> getMemberIds () | RETURNS A LIST OF IDs FOR THE MEMBERS OF THE ObjectLabel. MEMBER IDs FOR MEMBER OBJECTS THAT ARE NOT AVAILABLE ON THE CURRENT STAGE WILL NOT BE RETURNED |

FIG. 12H

| | METHOD | DESCRIPTION |
|---|---|---|
| METHODS | | |
| java.util.List<ManagedObjectVCMRef> | getMemberIds (boolean filterAvailable) | RETURNS A LIST OF IDs FOR THE MEMBERS OF THE ObjectLabel. IF filterAvailable IS SET TO TRUE, METHOD RETURNS MEMBER IDs ONLY FOR MEMBERS THAT ARE AVAILABLE ON THE CURRENT STAGE. IF SET TO FALSE, METHOD WILL RETURN MEMBER IDs REGARDLESS OF MEMBERS BEING AVAILABLE ON THE CURRENT STAGE |
| java.lang.String | getName () | RETURNS THE NAME FOR THE ObjectLabel INSTANCE |
| ObjectLabelRef | getObjectLabelRef () | RETURNS A REFERENCE TO THE ObjectLabel OBJECT THAT THIS ObjectLabelData BELONGS TO |
| ObjectLabelRef | getParentLabel | RETURNS THE PARENT LABEL FOR THE ObjectLabel INSTANCE |
| ObjectLabelPropertyData [ ] | getPropertyData () | RETURNS THE SET OF PROPERTY DATA FOR THE ObjectLabel |
| ObjectLabelPropertyData | getPropertyData (java.lang.String name) | RETURNS A PROPERTY DATA ENTRY FROM THE SET OF PROPERTY DATA FOR THE ObjectLabel AND PROPERTY NAME |

FIG. 12I

METHODS

| | METHOD | DESCRIPTION |
|---|---|---|
| java.lang.String | getPropertyValue(java.lang.String name) | RETURNS THE VALUE FOR A SPECIFIED PROPERTY OF THE ObjectLabel |
| private boolean | hasAspectData (java.lang.String name) | DETERMINES IF THE ObjectLabel HAS AN ASPECT DATA FOR A SPECIFIED ASPECT NAME |
| boolean | hasLocalizedData (AsLocaleRef locale) | DETERMINES IF THE ObjectLabel HAS LOCALIZED DATA FOR A SPECIFIED LOCALE |
| boolean | hasMemberData () | DETERMINES IF THE ObjectLabel HAS ANY MEMBER DATA (i.e., HAS ANY MEMBERS). IF ALL MEMBERS ARE NOT AVAILABLE ON THE CURRENT STAGE THEN THE ObjectLabel WILL BE CONSIDERED AS NOT HAVING ANY MEMBER DATA |
| boolean | hasMemberData (Boolean filterAvailable) | DETERMINES IF THE ObjectLabel HAS ANY MEMBER DATA (i.e., HAS ANY MEMBERS). If filterAvailable IS SET TO TRUE, CHECKS FOR MEMBER DATA ONLY FOR MEMBERS THAT ARE AVAILABLE ON THE CURRENT STAGE; SET TO FALSE TO CHECK FOR MEMBER DATA REGARDLESS OF MEMBERS BEING AVAILABLE ON THE CURRENT STAGE |
| boolean | hasMemberData (ManagedObjectVCMRef member) | DETERMINES IF THE ObjectLabel HAS A MEMBER DATA FOR THE SPECIFIED MEMBER ID. IF THE MEMBER OBJECT IS NOT AVAILABLE ON THE CURRENT STAGE, ObjectLabel WILL BE CONSIDERED AS NOT HAVING THE MEMBER DATA FOR THE SPECIFIED MEMBER |

FIG. 12J

| | METHODS | |
|---|---|---|
| | METHOD | DESCRIPTION |
| boolean | hasMemberData (ManagedObjectVCMRef member, boolean filterAvailable) | DETERMINES IF THE ObjectLabel HAS A MEMBER DATA FOR THE SPECIFIED MEMBER ID. If filterAvailable IS SET TO TRUE, CHECKS FOR MEMBER DATA ONLY FOR MEMBERS THAT ARE AVAILABLE ON THE CURRENT STAGE; SET TO FALSE TO CHECK FOR MEMBER DATA REGARDLESS OF MEMBERS BEING AVAILABLE ON THE CURRENT STAGE |
| boolean | hasPropertyData (java.lang.String name) | DETERMINES IF THE ObjectLabel HAS A PROPERTY DATA FOR THE SPECIFIED PROPERTY NAME |
| boolean | isPublishable () | GETS THE PUBLISHABLE STATE FROM THE ObjectLabel INSTANCE |
| private void | removeAspectData (java.lang.String name) | REMOVES AN ASPECT DATA ENTRY FROM THE SET OF ASPECT DATA FOR THE ObjectLabel |
| void | removeLocalizedData (AsLocaleRef locale) | REMOVES A LOCALIZED DATA ENTRY FROM THE SET OF LOCALIZED DATA FOR THE ObjectLabel |
| void | removeMemberData (ManagedObjectVCMRef member) | REMOVES A MEMBER DATA ENTRY FROM THE SET OF MEMBER DATA FOR THE ObjectLabel |
| void | removePropertyData (java.lang.String name) | REMOVES A PROPERTY DATA ENTRY FROM THE SET OF PROPERTY DATA FOR THE ObjectLabel |
| private void | setAspectData (ObjectLabelAspectData [ ] aspectData) | SETS THE SET OF ASPECT DATA FOR THE ObjectLabel |
| void | setDescription (java.lang.String description) | SETS THE DESCRIPTION FOR THE ObjectLabel INSTANCE |

FIG. 13A

| NESTED CLASSES | | |
|---|---|---|
| TYPE | NAME | DESCRIPTION |
| static interface | ObjectLabelAspect.ObjectLabelAspectFactory<T> | ObjectLabelAspectFactory IS AN INTERFACE IMPLEMENTED BY AN ASPECT FACTORY FOR EACH ObjectLabel ASPECT IMPLEMENTATION |

FIG. 13B

| FIELDS | | |
|---|---|---|
| TYPE | NAME | DESCRIPTION |
| static java.lang.String | ASPECT_FACTORY_CLASS_NAME | NAME GIVEN TO AN ASPECT FACTORY CLASS DEFINED AS A NESTED CLASS WITHIN AN ASPECT CLASS |
| static java.lang.String | ASPECT_UTILITIES_CLASS_NAME | NAME GIVEN TO AN ASPECT UTILITIES CLASS DEFINED AS A NESTED CLASS WITHIN AN ASPECT CLASS |

FIG. 13C

| METHODS | | |
|---|---|---|
| | METHOD | DESCRIPTION |
| ObjectLabel | getObjectLabel | RETURNS THE ObjectLabel INSTANCE THAT THE CURRENT ASPECT INSTANCE IS ENCAPSULATING |
| void | prepareForPersistence () | PREPARES A GIVEN INSTANCE OF AN ObjectLabel INSTANCE FOR PERSISTENCE. THE METHOD IS CALLED ON EACH ASPECT INSTANCE SET ON AN ObjectLabel JUST BEFORE THE ObjectLabel INSTANCE IS PERSISTED TO THE DATABASE. THE METHOD CAN INCLUDE ANY FINAL ASPECT LOGIC THAT SHOULD EXECUTE BEFORE AN ObjectLabel IS PERSISTED |

CONTENT MANAGEMENT SYSTEM AND METHOD FOR SYNCHRONIZING CONTENT TRANSLATIONS

RELATED APPLICATIONS

This application claims priority under 35 U.S.C. § 119(e) to U.S. Provisional Patent Application No. 62/411,372, entitled "Content Management System and Method for Managing Ad-Hoc Collections of Content," filed Oct. 21, 2016 and U.S. Provisional Patent Application No. 62/411,373, entitled "Content Management System and Method for Synchronizing Content Translations," filed Oct. 21, 2016, each of which is hereby fully incorporated by reference herein for all purposes.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

Embodiments of the present disclosure are related to content management. More specifically, embodiments are related to systems that use label objects to synchronize translations of content items.

BACKGROUND

Enterprises are complex organizations that may employ long-lived software systems, such as Internet websites, that are accessible through a web-tier by a potentially unlimited number of end users. Over time, the content viewable through the website may change. The process of making content available to a website system so that the website system can distribute the content to a target audience (e.g., World Wide Web users, corporate intranet users or other audience) is generally referred to as publication. In some models of website publication, website content is developed in a development environment and then published to a production environment such that the production website system can provide content to the target audience. In some implementations, there may also be one or more test stages between the development and production environments.

A piece of content may go through a lifecycle that involves a workflow of editing, approvals, publishing and so forth. In some cases, a user managing content for a website may wish to create and manage an arbitrary collection of content. One conventional solution is for a user to store a collection of content in a particular file system folder while performing a desired operation or set of operation on the content. However, this method changes the location of the content and may break references to the content. Furthermore, using a file system folder structure to create an arbitrary group of content requires additional coordination between all users (e.g., content contributors, content managers) who may need access to the content.

Some conventional web content management systems allowed users to "tag" content items. In these systems, a tag is added to part of the properties of a content item. Such tags are inflexible and can inadvertently disrupt a content item's lifecycle. Because tagging in this manner changes the properties of the content item, the content item becomes "dirty" and may have to go back through its lifecycle of approval and publication. When a large number of content items are tagged, a large number of items may need to be reprocessed. Republication of a large number of content items that have been tagged is costly in terms of system and network resources. Furthermore, republication of a large number of content items can cause the response time of a production system to suffer because the caching tier of the production system will refresh for content that the production system sees as updated content due to republication even though the actual content may not have changed.

Content management problems may be exacerbated for multi-lingual websites. Efforts have been made in conventional content management systems to manage multilingual content using either a translation-centric or an object-centric model. Translation-centric solutions manage translations of content as distinct objects and do not associate different translated versions of the content with each other. Object-centric solutions model translated versions of content as different values/versions of the same object, and require additional metadata to identify what translated versions of content are related on the web-tier. Object-centric solutions require independent management for each of the translated versions of content on the web tier. More specifically, translation-centric solutions model translations as different objects to provide independent life-cycles for translations. However, translation-centric solutions suffer from high reference maintenance cost associated with continual modification to existing software to refer to new translations. Object-centric solutions model translations as different values of the same object, thereby avoiding the reference maintenance cost problem. However, object-centric solutions suffer from tight coupling of translations to the lifecycle of a single object. This increases maintenance costs when translations need to be decoupled, for instance, in the event those translations diverge, or if they otherwise need to be managed independently.

Decoupling different translations into separate objects presents its own problems, particularly as content is updated. Typically a change is first made in a source language (e.g., English) and then propagated to other translations of the content. However, in multilingual organizations, updates to different translations of content may also happen simultaneously. For example, in a multinational news organization, one user may update the English version of a breaking news story, while another user may simultaneously update the German version in a different manner, while the French version remains unchanged. Difficulties arise in preventing conflicts between the various translations and ensuring that the objects containing the various translations of the content remain up to date as the content is updated/changed.

SUMMARY

Embodiments described herein provide systems and methods of synchronizing content translations. One embodiment includes a content management system comprising a data store storing content items for the content management system, the content management system coupled to the data store. The content management system can be configured to receive a translatable change to a source content item and track the source translation via a label object, the label object comprising label object behaviors and label objects properties. The content management system can be further configured to assign a set of corresponding content items to the label object, the corresponding content items corresponding to different translations of the source content item. The content management system can remove a corresponding content item from the label object in response to an input indicating that the corresponding content item should be removed. The content management system may further prevent changes that require translation to content items in the set of corresponding content items while any corresponding content item is a member of the label object, wherein the label object is a separately managed object from the source content item and the corresponding content items.

According to one embodiment, the content management system is further configured to prevent additional changes to the source content item that require translation while any corresponding content item is a member of the label object.

The content management system may be further configured to determine that the source content item is a member of a translation group and determine the set of corresponding content items to assign to the label object based on the translation group.

The content items may be managed as content objects and the content management system can be configured to determine that the source content item is a member of the translation group from a content object property for the source content item.

The content management system can be configured to identify that the set of corresponding content items require translation from the label object and send the corresponding set of content items to a translation provider.

According to one embodiment, the input indicating that the corresponding content item should be removed from the label object comprises an updated translation of the corresponding content item.

The content management system can be further configured to add previously removed corresponding content items back to the label object in response to receiving a new translatable change to the source content item. The content management system can further be configured to delete the label object when all of the set of corresponding content items have been removed from the membership of the label object.

According to one embodiment, tracking the source translation and assigning the set of corresponding content items to the label object comprises updating the label object with references to content object identifications for content objects corresponding to the source content item and the set of corresponding content items.

The content objects can comprise content object properties having values. The content management system can be configured to track the source content object and assign the set of corresponding content items to the label object without changing the values of the of the content object properties.

The label object can reference an aspect that provides a property and behavior to track the source content item.

The content management system can be configured to receive a content management command and perform a the content management operation in response to the content management command, the content management command comprising a translate command and the content management operation comprising sending the set of corresponding content items that are members of the label object to a translation provider computer system.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 2A-2B illustrate one embodiment of a set of label properties for labels in a label hierarchy.

FIG. 3 illustrates one embodiment of a set of label properties for an example label.

FIG. 4A, FIG. 4B, FIG. 4C, FIG. 4D, FIG. 4E, FIG. 4F, FIG. 4G and FIG. 4H illustrate one embodiment of a label workspace and related interfaces for managing and using labels.

FIG. 11A illustrates an example of nested classes for one embodiment of a label object class.

FIG. 11B illustrates an example of fields for one embodiment of a label object class.

FIG. 11C illustrates an example of a constructor for one embodiment of a label object class.

FIGS. 11D-11N illustrate example methods for one embodiment of a label object class.

FIG. 12A illustrates an example of nested classes for one embodiment of a label object data class.

FIG. 12B-12C illustrates an example of fields for one embodiment of a label object data class.

FIG. 12D illustrates an example of a constructor for one embodiment of a label object data class.

FIGS. 12E-12J illustrate example methods for one embodiment of a label object class.

FIG. 13A illustrates an example of nested classes for one embodiment of an aspect class.

FIG. 13B illustrates an example of fields for one embodiment of an aspect class.

FIG. 13C illustrates an example of one embodiment of methods for one embodiment of an aspect class.

DESCRIPTION

Figure 1:
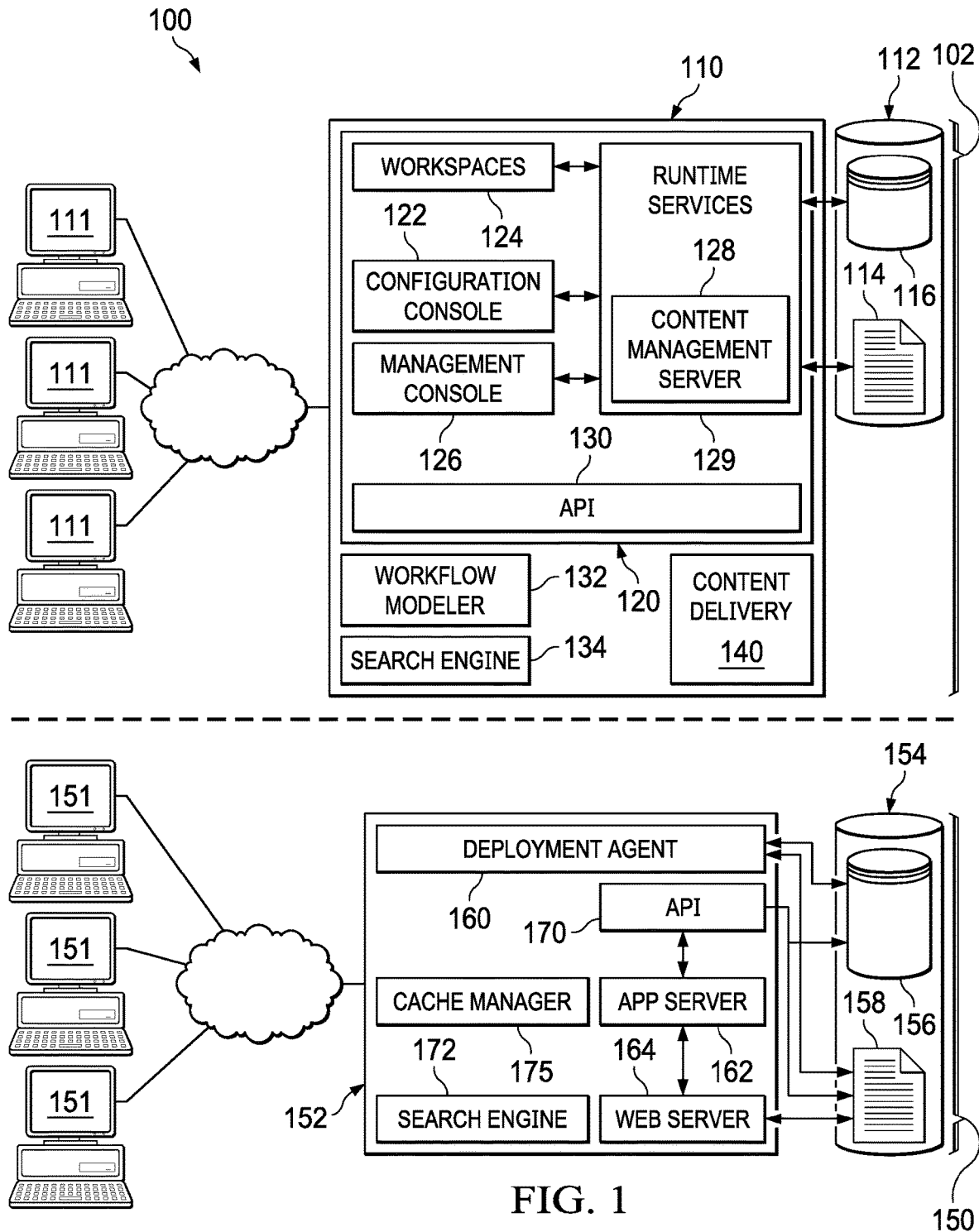
FIG. 1 is a diagram of a content management and delivery architecture that includes a management stage and a delivery stage to deliver the website to a target environment.

The invention and the various features and advantageous details thereof are explained more fully with reference to the non-limiting embodiments that are illustrated in the accompanying drawings and detailed in the following description. Descriptions of well-known processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before discussing specific embodiments, a brief overview of the context of the disclosure may be helpful. As part of the process of deploying content over a network, content may be "published" from a development environment to a production environment. Generally, when content is published it is transferred to a production server and is made available from the production system on the World Wde Web, intranet or other target environment.

Publication methods can be classified as non-dynamic or dynamic. In non-dynamic systems, content or other assets are transferred to a production system, but are not made available to the application servers of the system until the assets are placed in appropriate directories and the application servers reconfigured to reference the directories. Typically, this process involves a system administrator or other user managing movement of the assets and configuration of the application servers. In dynamic publications systems, on the other hand, website assets are deployed to a website repository at resolvable locations and become active by virtue of their publication such that they are immediately usable by the website system's application servers. An agent program in the production environment can receive the website assets and place the assets in the appropriate repository locations, change the doc root filings and take other actions to make the content immediately available. It should be noted that "dynamic publication" and "non-dynamic publication", in this sense refers to the mechanisms for making content available to the production system, not whether the production system uses that content to dynamically generate webpages.

Regardless of whether a dynamic or non-dynamic publication model is used, creating and updating a website may require managing and delivering a large number of assets. It may be helpful to a user managing content to create arbitrary collections of content for management or delivery purposes. Embodiments described herein provide new web content management solutions that address deficiencies with conventional approaches of managing collections of content.

In accordance with one embodiment, a web content management system is provided that allows users to create collections of content for management or delivery purposes by assigning content items to labels. A user can search using a label to find content items assigned to the label and access the content items to perform actions on the content items. Labels may be persisted in the system as managed objects separate from content objects. Because the labels are separate managed objects from the content, the labels can be implemented in a manner that does not change the content items or disrupt the lifecycle of the content. The labels may also have a flexible structure that allows labels to be easily extended and nested. Moreover, managed objects can be members of multiple labels.

Labels may be categorized by "label domains". Label domains are high level categories used to define broad classes of labels. Each label domain has a set of properties or policies that define the general nature of every label in the domain. For example, "Personal", "Internal", "Public" and "System" domains can be defined in which:

Personal labels can only be viewed by the user who created them.
Internal labels can be viewed by all users with the right permissions.
Public labels can be viewed by all users and can be published. For example, public labels can be included in smart list criteria.
System labels are internally used labels created by the system. System labels are not presented to users through the user interface.

Thus, domains may define policies for descendant labels, such as access policies and publication policies.

The labels feature may further include an aspect mechanism that can assign aspects to labels where the aspects define specialized behavior for labels. A label aspect is construct that defines a set of properties for labels assigned that aspect such as, for example, rules that apply or could apply to the labels assigned that aspect. The content management system may also include label actions that can be applied to label members. By way of example, but not limitation, the system may support label actions to approve, define a scheduled publishing date, and invoke translation processes for label members.

FIG. 1 is a diagram of a content management and delivery architecture 100 that includes a management stage 102 at which a website and updates to the website are developed and a delivery stage 150 to deliver the website to a target environment. Delivery stage 150 may be a production stage at which the content is made available to the target audience (e.g., over the Internet, corporate Intranet or other network) or may be an intermediate stage between management stage 102 and the production stage.

Management stage 102 may include a content management system 110 comprising computer-based tools running on one or more server machines for managing editing, creation, lifecycle and staging of content for a website. Content management system 110 may include features for authorized users at one or more client computers 111 to manipulate, tailor, and publish to a website, such as an internal site (e.g., an intranet), or a user-facing website, such as a newspaper or ecommerce site, etc. Content and related information managed by content management system 110 may be stored in repository 112 which may comprise one or more storage systems. In one embodiment, files may be stored in a file system 114 and other assets may be stored in a content database 116, though other organizations of assets may also be used.

Delivery stage 150 includes a content delivery system 152 that comprises one or more server machines running a set of tools to provide a website to users at client devices 151. The delivery stage may be a production stage that delivers content to the intended audience, for example, to customers of a live website, or other stage. The delivery stage may also be an intermediate stage between the management stage and the production stage.

As described above, the content management system 110 and content delivery system 152 may be embodied on one or more server machines operating in a network environment. A suitable server machine may comprise a data processing system having one or more central processing units (CPU) or processors coupled to one or more user input/output (I/O) devices and memory devices. Examples of representative I/O devices may include, but are not limited to, keyboards, displays, monitors, touch screens, printers, electronic pointing devices such as mice, trackballs, styluses, touch pads, or the like. Examples of memory devices may include, but are not limited to, hard drives (HDs), magnetic disk drives, optical disk drives, magnetic cassettes, tape drives, flash memory cards, random access memories (RAMs), read-only memories (ROMs), smart cards. Such a data processing system may be coupled to a display, an information device, and various peripheral devices such as printers, plotters, speakers, etc. through appropriate I/O devices. Furthermore, such a data processing system may also be coupled to external computers or other devices through network interface(s), wireless transceiver(s), or other communication means coupled to a network, such as a local area network (LAN), wide area network (WAN), or the Internet. Other communication implementations are also possible.

Content may be deployed from management stage 102 to delivery stage 150 by moving website assets from management repository 112 to delivery stage repository 154. The website assets may include file assets and non-file assets for one or more websites. File assets may include resources such as code including JSP pages, ASP pages, Java classes and/or object oriented programming language classes, image files, multi-media files, text files, and other resources. Non-file assets include assets defining users, groups, modules, module types, pages (complete pages or fragments of pages), menus, themes, structures, styles and templates, logon permissions, administrative permissions, site branding, site content, site navigation, instantiated programming language objects, permissions, user preferences settings. It should be noted that such assets belonging to an entity may be shared among the entity's websites.

In the illustrated embodiment, content management system 110 includes a set of content management services 120 that provide functionality to gather, organize and manage content for delivery and a set of delivery services 140 to facilitate delivery to deployment of content to delivery stage 150. Content management services 120 include a configuration console 122, content workspaces 124, a management console 126, a content management server 128, content API 130 and runtime services 129.

Configuration console 122 provides a graphical user interface (e.g., a web-based interface) that allows a user to configure and administer content management system 110 and provides status information. In one embodiment, configuration console 122 may be a browser-accessible Web application.

Content workspaces 124 provide a set of graphical interfaces to allow content contributors to create, organize, and manage sites and content. Content workspaces 124 can provide the primary interface for general publishing tasks, such as adding, approving and managing content. According to one embodiment, content workspaces may be browser-based.

Management console 126 provides a graphical user interface to allow administrator to manage content management. An administrator can perform tasks such as creating user roles, creating content type definitions, managing workflow definitions or performing other administrative tasks. Management console 126 may provide a browser-based graphical user interface.

Content management server 128 is responsible for managing assets in repository 112, for example, managing source content in file system 114 and database 116. Content management server 128 may run within runtime services 129 that provide a runtime environment, provide access to services such as application servers, directory services, database drivers and other runtime services. Content management server 128 can track each piece of content, including, for example, tracking which website(s) the piece of content is used in, who created the content, the content's current state and version, labeling of content, etc. A search engine 134 can provide search services for content workspaces 124, management console 126 or other components of content management system 110 so that managed assets can be easily retrieved.

Website assets, including file assets and non-file assets, may be managed according to an object model in which content and other aspects of a website are organized as a hierarchy of objects ("managed objects"). It should be noted that such assets belonging to an entity may be shared among the entity's websites and thus the collections of objects for the websites need not be mutually exclusive.

The managed objects may obey a number of predetermined rules and properties when it comes to the content life cycle and a security model (e.g., logical placement in the repository, approval and publishing rules, etc.). Each managed object may include methods that may be performed by the object and content management metadata that provides the state of the object, such as: a global unique identifier (GUID), security related information (e.g., access control list), creation date, creator, modification date, modifier, path within a content hierarchy, approval status, publishing status, scheduled publish and unpublish dates and other metadata.

Website content may be managed as a set of content items. A content item represents a piece of content, such as a file, record or set of fields in a database, that is managed as a content object. In some cases, rather than storing the piece of content, the content object may reference a piece of content (e.g., a file, database record or individual fields or other piece of content) in another repository. Each content object can have an arbitrary amount of content management metadata associated with it. Content objects may reference file assets including resources such as code including JSP pages, ASP pages, Java classes and/or object oriented programming language classes, images including GIF files, and resources. In some cases, the content object may reference external content. In accordance with one embodiment, content management system may maintain content management metadata in content database 116.

Figure 10:
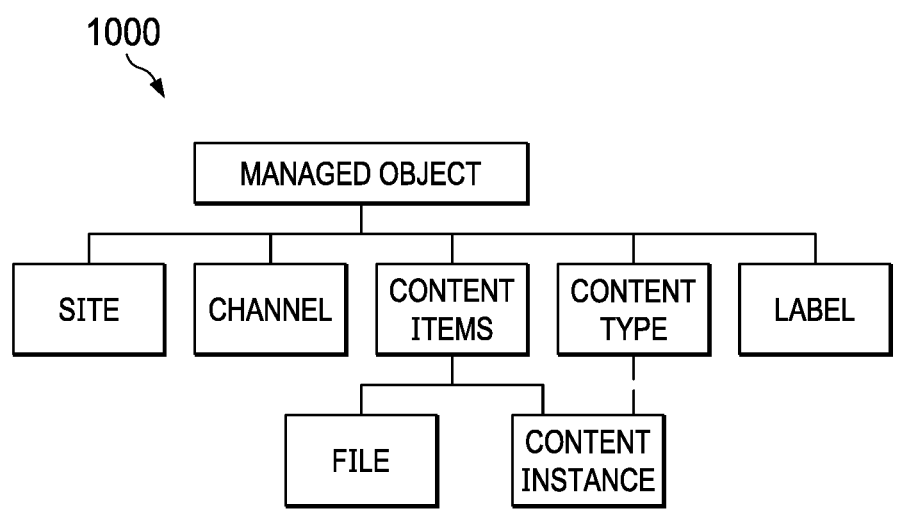
FIG. 10 illustrates one embodiment of an object hierarchy.

According to one embodiment, the content management system 110 manages website content according to a hierarchy as described in U.S. patent application Ser. No. 14/153,863, entitled "System and Method for Selective Activation of Site Features," which is hereby fully incorporated by referenced herein. Referring briefly to FIG. 10, one embodiment of an object-model 1000 in which content and other aspects of a website are organized as a hierarchy of objects is shown. Examples of objects include:

Site: A "site" object refers to a logical container for content instances and channels representing a site structure. A site object serves as the definition of the online endpoint (which can be a website) for content published to the web.

Channel: A "channel" object refers to a logical node in a site structure to which content items can be associated. In this context, "channels" can be used to organize and manage user access to managed content. As a specific example, a website may have channels such as news, sports, entertainment, etc., each being defined by a channel object in the site navigation tree of the website and accessible by visitors of the website through, for instance, a page or a link in the website domain.

Content type: A "content type" object contains a logical definition for a piece of structured content. In some embodiments, a website development system may support content types that meet common content management and presentation management requirements (e.g., Images, Videos, Pages, Regions, Components, Themes, and more.)

Content instance: A "content instance" object refers to an individual piece of content created from a given content type definition (contained in a "content type" object).

Static file: A "static file" object refers to any individual file uploaded and managed by the content management system.

Content item: a content item may represent a managed piece of content that is either of the "content instance" object type or of the "static file" object type described above. Content items can be stored as corresponding content objects in a repository. In some cases, rather than storing the content items, the repository can include references to another system and its corresponding objects or repository.

Label: A "label" object in hierarchy 1000 refers to an object that is independent from the objects that represent content and define site structure (e.g., content objects, channel objects). A label object includes properties to group arbitrary collections of other managed objects.

Each of the objects types listed above can be defined by a variable number of attributes (e.g., name and description are default attributes for each object) with default settings which can be configured if needed. Each content object and label can have an arbitrary amount of metadata associated with it. For purposes of website management, such metadata may include, by way of example but not limitation, whether the content object has been approved for publication, whether it was published, or any other information that is useful in classifying the content object for website management.

Those skilled in the art will appreciate that the objects types listed above are meant to be exemplary and non-limiting and that additional object types not listed here are possible.

Returning to FIG. 1, content management system 110 further includes a workflow modeler 132 that provides an interface to allow a user to model workflow definitions and alter workflows. Content management services 120 can integrate workflow information with content management to allow a user with appropriate privileges (e.g., a site coordinator) to review the state of content within each stage of site production. For example, a user can review whether content is awaiting approval, has been tested, has been deployed and so forth.

Content API 130 provides methods for retrieving content that has been delivered to file system and databases by one or more deployment agents. Content API 130 may also provide a label API to allow creating, editing, deleting and otherwise managing labels.

Content delivery services 140 comprise resources for staging and delivering content. Content delivery services 140 can include services to notify deployment agents at delivery stage(s) 150 of updates (publication events) and provide content to delivery stage(s) 150.

Delivery stage 150 provides one or more delivery endpoints for content (e.g., web servers, application servers, databases, or the like). In the embodiment illustrated, content delivery system 152 comprises one or more server machines running a set of tools to provide a website to users at client devices 151. Content delivery system 152 comprises deployment agent 160 that deploys website assets to a content repository 154. Deployment agent 160 can deploy assets to databases (e.g., content database 156), file systems (e.g., file system 158) or other systems.

Content delivery system 152 further includes an application server 162 and a web server 164 to respond to and process client requests, to generate web page files for web pages provided to clients (web page in this context can refer to an overall web page or a portion of web page, either of which may be made up of one or more page fragments) and respond to client requests. A delivery API 170 provides methods so that the application server can extract content from database 156 and file system 158. API 170 may also provide a label API to allow creating, editing, deleting and otherwise managing labels. Content delivery system 152 also includes a search engine 172 to provide search services.

Content delivery system may also include a cache management application 175 ("cache manager 175"). One or more levels of cache can be employed to store commonly used pages, fragments of pages and other assets. In some cases, assets may be cached at other servers or systems, including caching servers controlled by third parties. Content delivery system 152 may also include other components such as configuration components.

In operation, content contributors can use content workspaces 124 or management console 126 to create, organize and manage content. A workflow author can use workflow modeler 132 to design a workflow or modify a workflow, to create repeatable processes for creating, managing and deploying content. Workflows can be assigned to specific sites or content types. Content workspaces 124, management console 126 and workflow modeler 132 communicate with content management server 128 to manage content and other assets. Content management server 128 reads and writes data to and from database 116 and reads and writes files to and from file sources (e.g., file system 114). Content management server 128 notifies content delivery services 140 when a user adds or changes content.

When a user selects to publish content to delivery stage 150, the content delivery service 140 notifies deployment agent 160 and deployment agent 160 collects content from content management system 110, distributes the content to destination file systems and databases (e.g., file system 158 and database 156), changes the doc root settings and takes other actions to make the content immediately available. If a content item is republished, cache manager 175 may identify items in cache that are stale (e.g., the content item in cache, pages or page fragments that include or were generated from the republished content item) and refresh the items in cache. The items may be refreshed immediately or in response to a request for a web page using those items or on the occurrence of another event.

When a client device 151 requests a web page, application server 162 and web server 164 may operate to provide web pages to users using content from repository 154 or other sources. Web server 164 can access file system 158 to return page files or may pass the request to application server 162, which resolves the request to return an existing web page file or generates a web page file having the appropriate content. Generating a web page file may include assembling a web page file from fragments of the web page source and other assets that are cached by cache manager 175 or stored in repository 154. Generating the web page file may also include generating new page source.

Returning to management stage 102, during the development or updating of the website, a user (e.g., a content supervisor or content contributor) at management stage 102 may wish to define a collection of content objects for management or delivery purposes. According to one embodiment, content management system 110 may support labels for labeling content objects. An object label may itself be a managed object (a "label object"). A label object class may define methods that may be performed by the label and instances may contain various data properties that define the label, including a global unique identifier (GUID), a name, a description, a parent label reference, member object references, label property values and localized data.

A label object may also include security related information (e.g., access control list), creation date, creator, modification date, whether the label is publishable and other metadata. The label objects can be independent of the objects that represent content and define site structure. Label objects, if publishable, can be published to content delivery system 152 without requiring republication of the content items assigned the label. In one embodiment, property data for labels may be persisted in database 116 or in another data store.

Figure 2A:
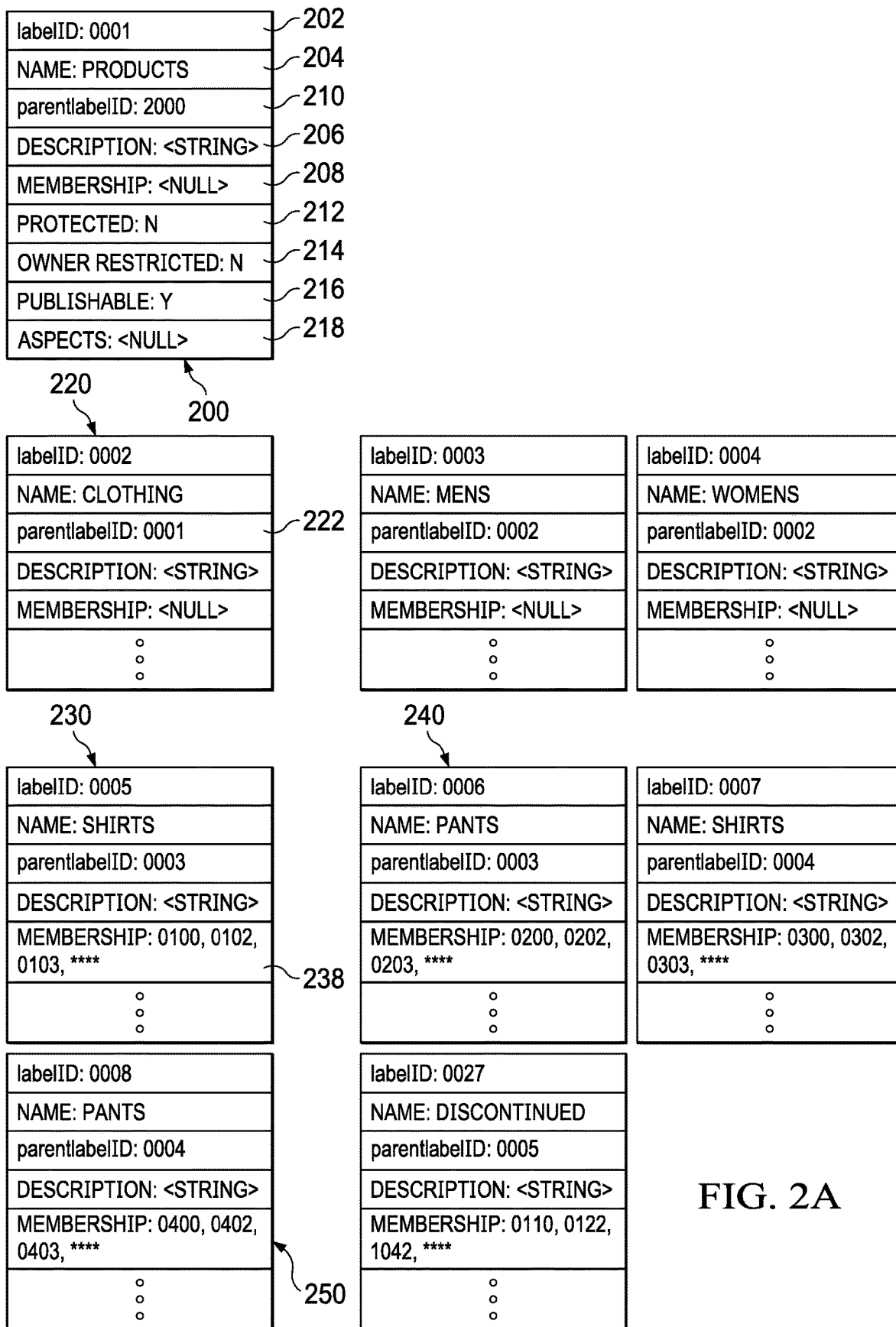

Referring to FIG. 2A, FIG. 2A is a diagrammatic representation of one embodiment of property data for a set of labels. Label objects contain various data properties that define a label, including, for example, an id, a name, a description, a parent label, member object references, property values and other data. Using the example of label 200, label 200 includes a labelID 202, such as a global unique identifier (GUID) that uniquely identifies the label, a user assigned name 204 (e.g., "Products") and a user assigned description 206.

A label may be associated with 0 or more other managed objects, such as content objects or label objects. Label 200 has a membership 208, which refers to the set of managed objects (e.g., content objects) assigned to the label. It can be noted that, in some embodiments, a label member may be any managed object. For example, a label may be a member of another label or a site or channel object (discussed below) may be a member of a label. In the illustrated embodiment, label 200 ("Products") does not have a membership, whereas content objects 0100, 0102 and 0103 have been assigned to label 230 ("Shirts") as indicated by membership 238. In accordance with one embodiment, when a user assigns content to a label, the label is updated with a reference to the content object (e.g., the GUID of the content object or other reference). This is unlike conventional tagging systems in which tags were added as a property of the item being tagged.

Labels may be nested to provide an organized hierarchy. Each label can be a root label (top of a label hierarchy) or have a parent label. For example, the labels of FIG. 2A provide the following hierarchy:

Products
  Clothing
    Men's
      Shirts
        Discontinued
      Pants
    Women's
      Pants
      Shirts In this hierarchy, "Products" corresponds to the top of the above-referenced hierarchy and "Clothing" is a nested label, and a child of "Products". According to one aspect of the present disclosure, "Products" may be the root label of the hierarchy. In another embodiment, the root label may be domain label, an example of which is discussed further in conjunction with FIG. 2B. Nesting may be implemented through a reference to a parent label. Label 200 ("Products"), for example, includes an entry of "2000" for parent-labelID 210 indicating that Label 200 is a child of the label having GUID 2000 (e.g., the "Public" domain label 260 of FIG. 2B), whereas label 220 ("Clothing") includes a parent-labelID 222 value of "0001" (the GUID of parent label 200 ("Products")). Label ACLs (e.g., authorized groups, permissions) may be propagated from a parent label to children labels. It can be noted that label authorization does not, in some embodiments, affect authorizations associated with member objects.

A content management system (e.g., content management system 110) may provide a label action framework that controls how content management operations are applied to labels and members of labels. The label action framework, according to one embodiment, may specify "label only" actions, "label recursive" actions and "recursive only" actions. "Label only" actions are actions that, when applied to a label, are only performed on the label. For example, content management system 110 may be configured such that if a user selects to perform a "clone" action on a label, content management sever 128 only clones the label, but does not clone the content objects referenced by the label. Using the example of FIG. 2, a "clone" action on label 230 would create a copy of label 230 (with a new GUID), but would not clone the content objects referenced in membership 238. It can be noted that an action that is "label only" when applied to a label, such as the "clone" action in the foregoing example, may be applied in other contexts to content objects referenced by the label. For example, in a system in which a "clone" action is configured as "label only", a user may still be able to clone a content object referenced by a label by applying the action directly to the content object rather than through the label.

A "label recursive" action refers to an operation that when applied to a label is performed on both the label and the membership. For example, a content management system may be configured such that if a user selects to perform a "delete" action on a label, both the label and the content object members are deleted. Using the example of FIG. 2, the "delete" action applied to label 230 would delete both label 230 and the content objects referenced in membership 238.

A "recursive only" action is an action that when applied to a label is only performed on members of the label. For example, a content management system may be configured such that if a user selects to perform a "translate" action on a label, the translate action is only performed on the members of the label. Using the example of FIG. 2, the translate action would translate the content objects referenced in membership 238, but would not translate label 230.

Table 1 below provides an example configuration of a label action framework. The table indicates whether, in the example configuration, an action is "label only" (e.g., clone), "label recursive" (e.g., delete) or recursive only (e.g., translate).

TABLE 1

| Label Action | Label | Recursive |
|---|---|---|
| approve | | x |
| associate | | x |
| clone | x | |
| delete | x | x |
| publish | | x |
| search | x | x |
| set language | | x |
| start workflow | | x |
| translate | | x |
| unpublish | | x |
| view | x | |

Table 1 is provided by way of example and other configurations and actions may be implemented. For example, in some embodiments, labels may be published/unpublished like other managed objects. A "publish" action may be a recursive action ("recursive only" or "label recursive" if the label itself is publishable). Thus, in some embodiments, labels may be used to publish an arbitrary group of content items.

It can be noted that for purposes of recursive actions as describe above, a nested label is not necessarily a member of a parent label. Accordingly, a "label recursive" or "recursive only" action applied to a parent label may not apply to a child label (unless the child is also a member of the parent label). However, because a label member can be any managed object, a label can be member of another label. As such, a user can define a macro label that contains labels as members to perform recursive actions on the other labels. For example, if a user wished to delete all "Pants" related content items, the user can create a new Pants label 300 as shown in FIG. 3 that references the labelIDs 0006 and 0008 (corresponding to Pants labels 240, 250 in FIG. 2A) in membership 310. The user can perform a delete action using Pants label 300. Because the delete action is a label recursive action in the example configuration of Table 1, a delete action to delete the Pants label 300 (the label having labelID 1000 as shown in FIG. 3) will also delete the labels with labelIDs 0006 and 0008 (Pants labels 240, 250 of FIG. 2A) and the objects with GUIDs 0200, 0202, 0203, 0400, 0402, 0403 (the members of Pants labels 240, 250 of FIG. 2A).

In other embodiments, the label action framework may be configured such that some or all label recursive or recursive only actions applied to a parent label are also applied to nested labels such that the action is performed on the parent label and nested labels (e.g., a publish action applied to the label with labelID: 0001 (Products label 200) results in publishing content items that are members of labels with labelIDs 0002-0008, 0027 in FIG. 2A.

In some cases, a label may reference content already published. For example, if an entity publishing a website wishes to list certain items as being on sale, the entity can publish a "sale" label referencing the content items for the items on sale. Content items can be marked as corresponding to the sale without republishing the content items through the use of the label. When the label is published, deployment agent 160 may add the label name to the keywords for the content items that are members of the label and, in some embodiments, may add the label name as keywords to members of nested labels.

Similar to other managed objects, label objects can be cached. It can be noted that since the labels are not contained in the managed objects that are members of the label, a label so that a user can use the APIs (API 130, 170) to get a label object and then read the members. The APIs (e.g., API 130, 170) can further support reading the set of labels for an item.

Thus, published labels may be cached by cache manager 175. If a label object is republished, cache manager 175 may identify the label in cache as stale, flush the cached label object and replace the cached label object with the newer version of the label object. However, because the label is not contained in the content items or other managed objects that are members of the label, the label can be republished/unpublished without rendering content items in the cache referenced by the label stale and, as a corollary, without rendering pages or page fragments that were generated from those content items stale.

With respect to search, search engine 134 or search engine 172 can be configured to search for labels. Users may search by keyword and get back content associated with a label. Search engines 134, 172 can be configured so that users can search specifically for content associated with a label. A user may also search on label properties.

The labels feature may further include an aspect mechanism that allows users to categorize labels according to label aspects that define specialized behavior for labels. A label aspect is a construct that defines specialized behaviors or properties for labels assigned that aspect. In some implementations, an aspect may be implemented as an interface, such as a Java interface. An aspect can be used to define a well-defined set of object label properties that can be accessed through an aspect implementation class rather than label object property. The set of properties for a given label can thus depend on the aspect(s) which are assigned to the label. However, an aspect is not required or limited to managing label object properties. An aspect implementation can be used to define any specialized behavior that can be provided by a given type of object label.

Referring to FIG. 2B, labels may be categorized by "label domains". Label domains are high level categories used to define broad classes of labels. Each label domain has a set of properties, or policies, that define the general nature of every label in the domain. For example, Personal, Internal, Public and System domains can be defined that specify the following for labels of those domains:

Personal labels can only be viewed by the user who created them.

Internal labels can be viewed by all users with the right permissions.

Public labels can be viewed by all users, but in addition can be published. For example, public labels can be included in smart list criteria.

System labels can be internally used labels created by the system. System labels are not presented to users through the user interface.

FIG. 2B provides diagrammatic representations of property data for one example of a Public domain label 260, Internal domain label 265, Personal domain label 270 and System domain label 275. According to one embodiment, each domain label is a root label and the labels in a system fall into one of the domains; for example, by being nested in a hierarchy under the domain label for the domain. Thus, in such an embodiment, a domain label will not have a parent label and all other labels may decedents of a domain label.

In the example embodiment of FIG. 2B, the domain labels define the following for labels in the corresponding domain: whether labels of a domain are protected; whether labels of a domain are owner restricted; a publish policy for labels of a domain; and required aspects that must be assigned to labels of a domain. Protected labels are not visible in the user interface. In the example of FIG. 2B, the System domain is the only one that is protected.

A label of an owner restricted domain is only visible in the user interface to the owner of the label. In the example of FIG. 2B, the Personal domain is the only one that is owner restricted.

Each label can have a "publishable" setting that indicates whether or not the label can be published. The publish policy of a domain indicates how that label setting is managed for labels of the domain. In one embodiment, the publish policy can be set to a) "Never": labels of the domain are never allowed to be set to publishable; b) "Always": labels of the domain are always forced to being publishable; or c) "LabelDefined": labels of the domain can be set to publishable or not as needed. In the example of FIG. 2B, the Public domain has a publish policy of "Always"; the Internal and Personal domains have a publish policy of "Never"; and the System domain has a publish policy of "LabelDefined".

With respect to required aspects, the required aspects can be used to set rules or properties specific to labels of a domain (or multiple domains if the more than one domain is assigned the required aspect). In the example of FIG. 2B, only the Personal domain has a required aspect, which, in this example, is LabelAccess. As noted above, labels to the Personal domain are only visible to the owner (creator) of the label. An "Owner" label property can be implemented through the label aspect LabelAccess so that labels in the Personal domain include the "Owner" property.

Referring to FIGS. 2A and 2B, the Products label 200 of FIG. 2A includes a value of "2000" for the property parentlabelID 210, meaning that Products label 200 is a child of the Public domain label 260. As such, label 200 is in the "Public" domain and is assigned the following properties/values when created: Protected: N (indicated at 212), Owner Restricted: N (indicated at 214), Publishable: Y (indicated at 216). Since Public domain label 260 does not include any required aspects and since, in this example, there are no other assigned aspects, label 200 does not include any assigned aspects (indicated at 218). Other labels in FIG. 2A will also have similar properties (not shown) because they are in the same hierarchy; though individual labels may be assigned aspects in addition the aspects defined by the domain and may include properties defined by those aspects.

Referring to FIGS. 1, 2A and 2B, label 200 is in the "Public" domain (indicated at 210). Accordingly, all authorized users of content management system 110 can view label 200. Furthermore, label 200 can be published for use by delivery stage 150 (indicated at 216).

In accordance with one embodiment, all labels are created within one of the defined domains. New, or custom, label domains can be created by users with sufficient permissions. For example, the capability to provide new domains may be restricted to system administrators. New aspects may also be defined. Again, the capability to define new aspects may be restricted to users with sufficient permissions, such as system administrators.

A content management system may also provide a label API or other interface to allow users, using a graphical user interface search and browse labels, and view items assigned to a selected label, sublabels of a selected label, or other information relating to a label. The content management system may further provide one or more interfaces to allow a user to perform operations on a label.

Examples actions that can be performed on or with a label include, but are not limited to:
  Create a label;
  Delete a label;
  Edit a label;
  Add a managed object to a label;
  Assign a managed object multiple labels;
  Delete a managed object from a label;
  View all labels;
  Add all items on a page to a label;
  Add all items in a channel to a label;
  Translate all items assigned to a label;
  Assign a set of user-defined items to a workflow payload;
  Search for all items assigned to a label;
  Delete all items assigned to a label;
  Publish all items assigned to a label;
  Search engine optimization (meta keywords, description)
  Approve all items assigned to a label;
  Unpublish all items assigned to a label.

Figure 4A:
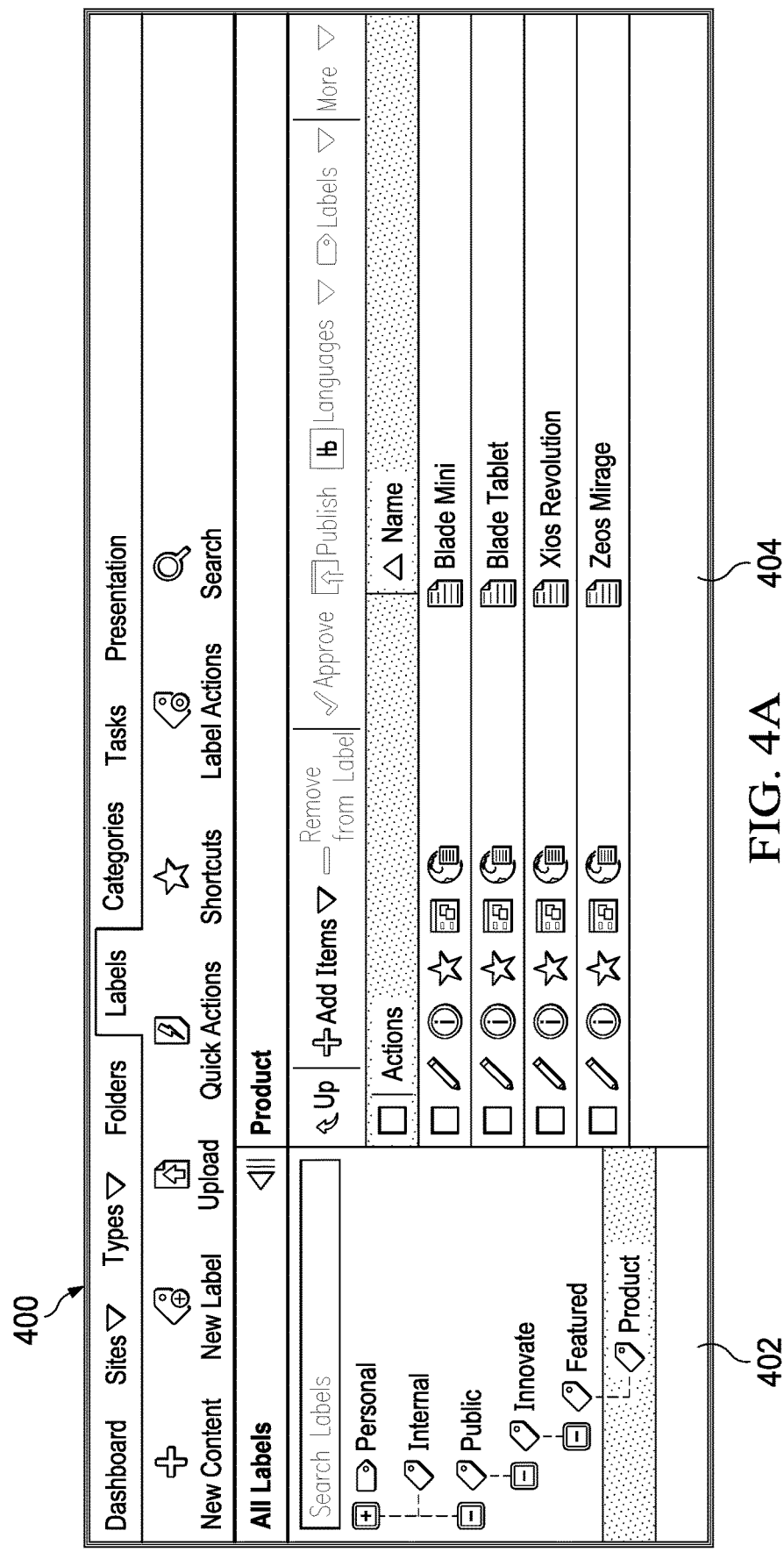
Figure 4B:
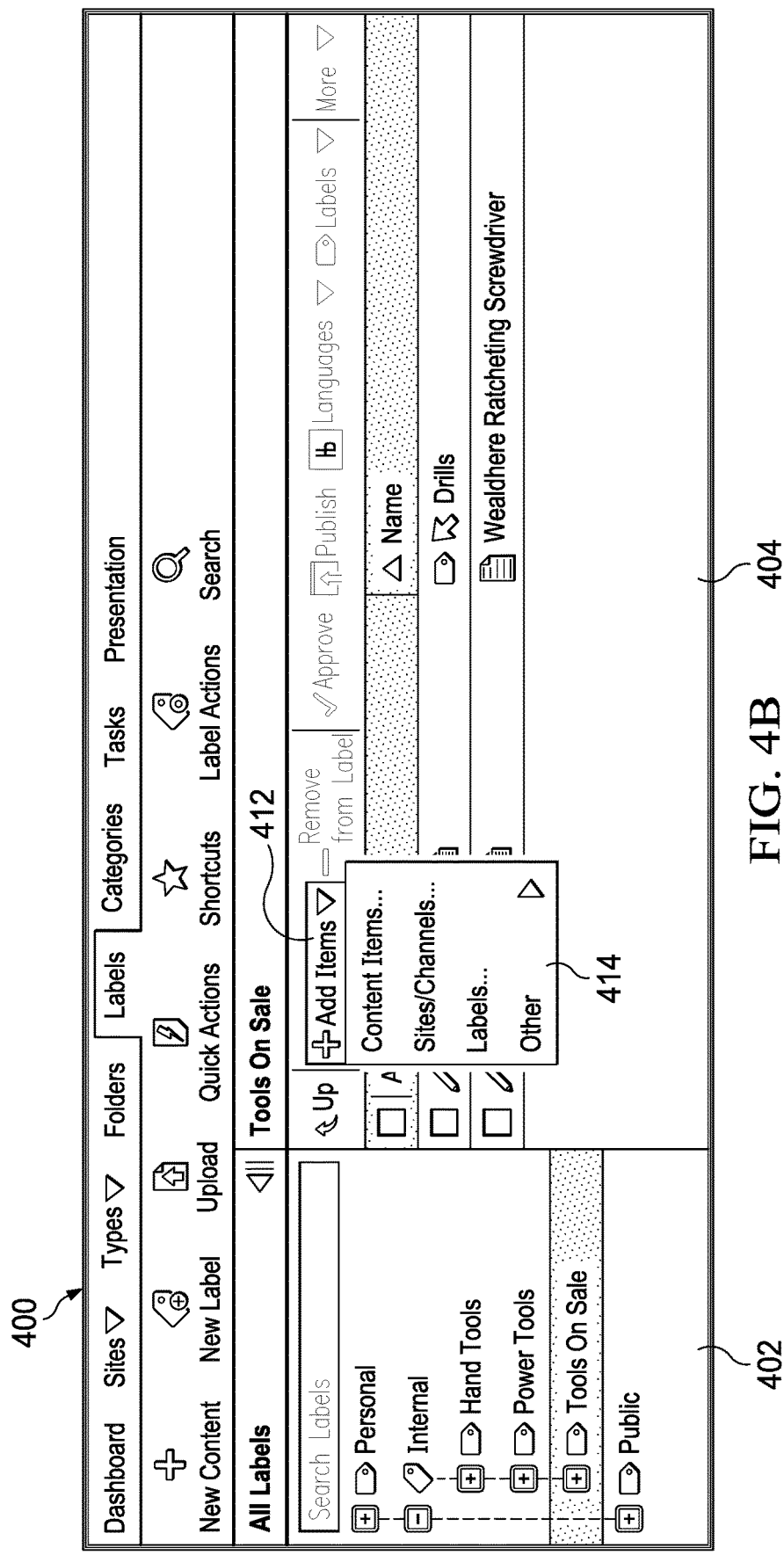

FIG. 4A and FIG. 4B illustrate a graphical user interface displaying a label workspace 400 in different states of operation. Label workspace may be a page in a web application, an interface provided by a heavy client or other client interface. Label workspace 400 allows a user to select various operations, such as creating new labels, adding or removing members from a label and selecting various actions to perform on labels and/or members. Label workspace 400 may be provided by a content workspace 124.

Label workspace 400 includes a label navigator 402 that allows a user to search, graphically navigate and select existing labels. The label navigator 402 graphically represents the label hierarchy. A label member navigator 404 displays members of a selected label. For example, in FIG. 4A, member navigator 404 displays content items assigned to the label "Product" and, in FIG. 4B, member navigator 404 displays content items associated with the selected "Tools on Sale" label.

The user may double click on a label or otherwise indicate that the user wishes to edit the label. In response to a request to edit an existing label or create a new label, the user may be presented with a user interface for editing a label. FIG. 4C illustrates a graphical user interface 420 for creating a label or editing portions of an existing label. In the example interface of FIG. 4C, the user can specify a name for the label, identify a parent label, which may be a domain label, and provide a description of the label. Interface 420 may include a number of controls to facilitate further editing of the label. For example, the user may select a "languages" tab 422 to switch to an interface to enter localized data for the label. Interface 420 may further include a button 424 that the user may select to switch to an interface that allows the user to enter other property values. Interface 420 may further allow a user to save edits to a label.

Returning to FIG. 4B, workspace 400 can include controls to add managed objects as members of a label. In FIG. 4B, for example, selecting button 412 causes menu 414 to be displayed. From menu 414, the user can select the type of managed objects to add to the selected label "Tools on Sale." Based on a selection in menu 414, the user will be presented with additional menus or interfaces that allow the user to select specific managed objects as members.

Figure 4D:
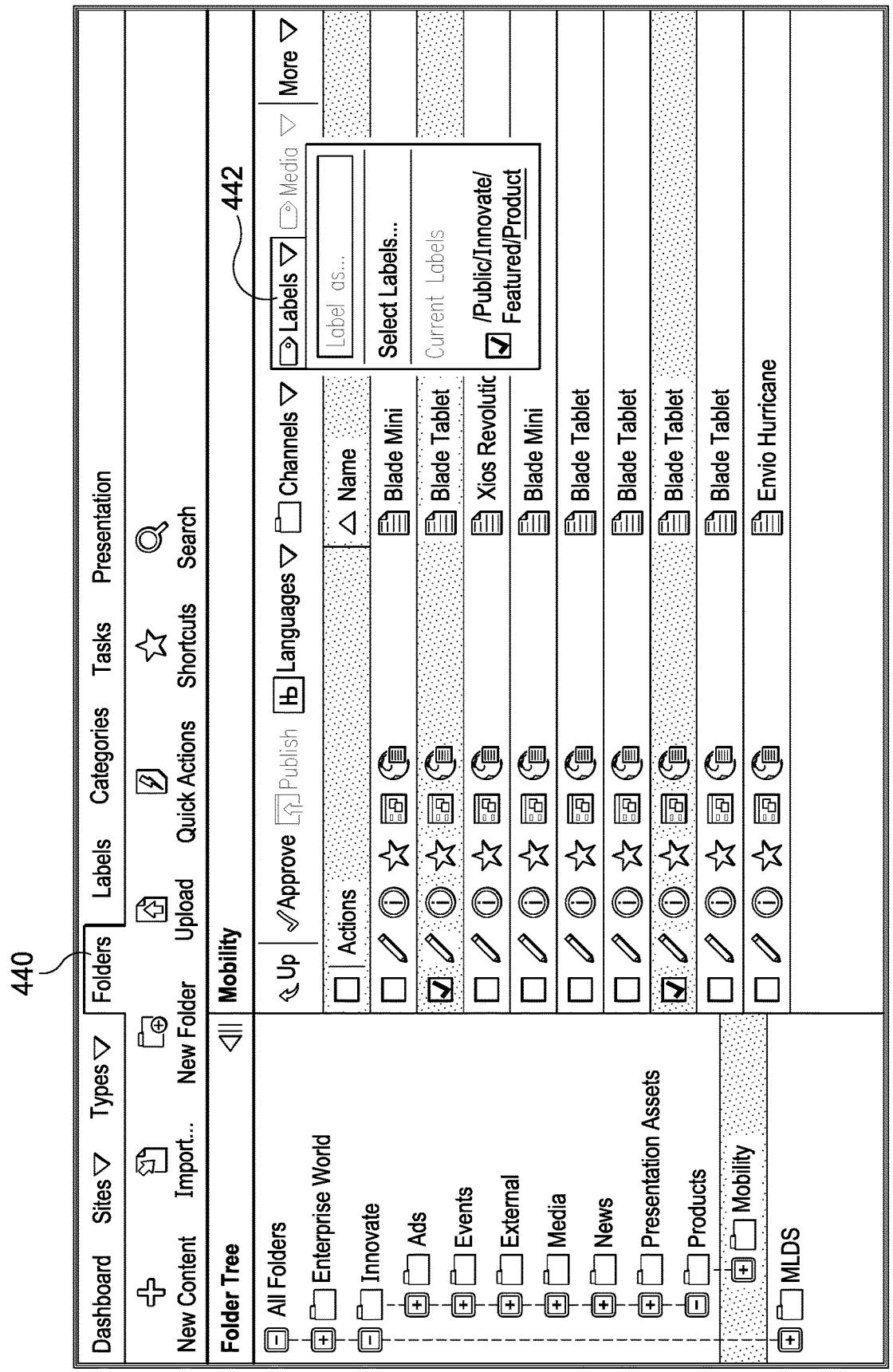

FIG. 4D illustrates that additionally or alternatively, a content workspace 440 used for more directly managing content items can provide controls 442 (e.g., buttons, menus and other controls) that allow a user to assign content items to labels.

Figure 4E:
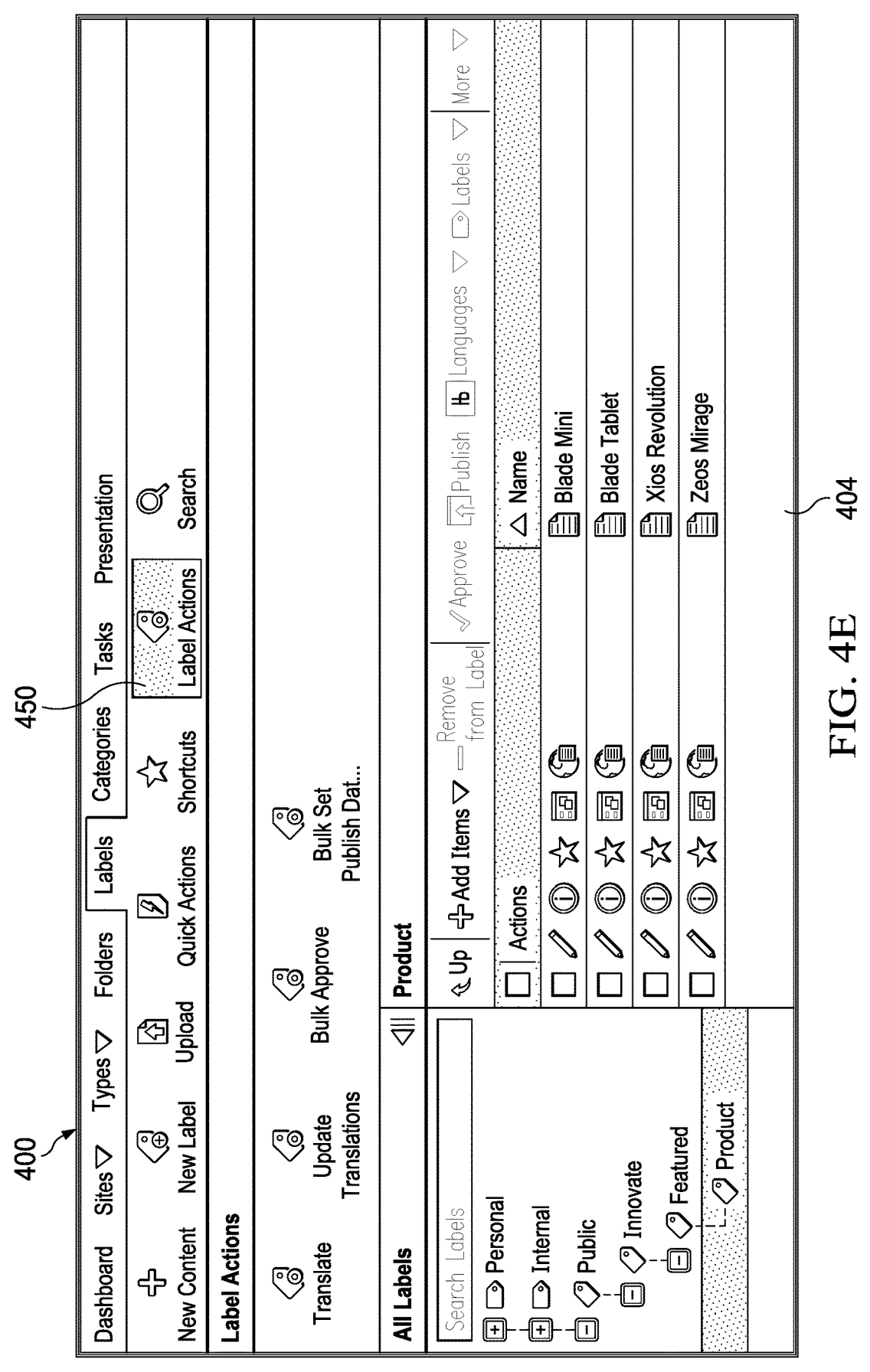

FIG. 4E illustrates that workspace 400 provides controls for running actions on labels. It can be noted, the actions available to a user may be limited based authorizations. With respect to FIG. 4E, by selecting button 450, the user can be presented with various actions that can be run on a selected label (e.g., "Product"). The user may then select an action, such as "Bulk Set Publish Date", and be provided an appropriate interface for the action. FIG. 4F, for example, illustrates a "Bulk Set Publish" interface that allows the user to set a schedule for performing a publishing operation to publish the members of a label (and in some implementations, the label itself).

Thus, as shown in FIG. 4F, the label action framework may provide bulk actions to operate on label members. Further, actions may have a lifecycle with defined start and stop dates or other temporal parameters.

Figure 4G:
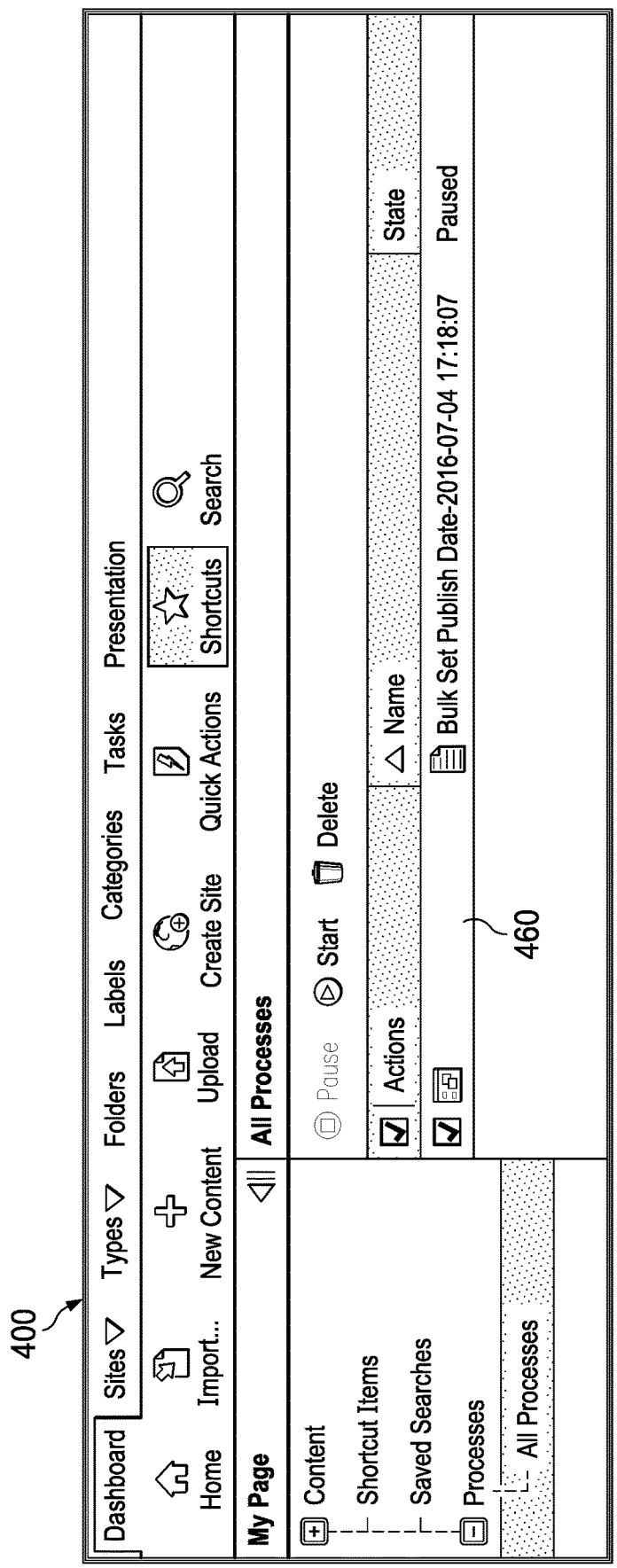

FIG. 4G illustrates an action monitoring interface 460. As shown in FIG. 4G, actions can be monitored and controlled in workspaces. For example, actions may be created, started, paused, resumed and completed in a workspace.

As can be understood from the foregoing, labels can be used to create collections and collections of collections. Labels may be used to publish arbitrary content items related to a particular campaign at one time. By using nested labels, a group of content items may be published together while remaining searchable under separate labels.

Figure 4H:
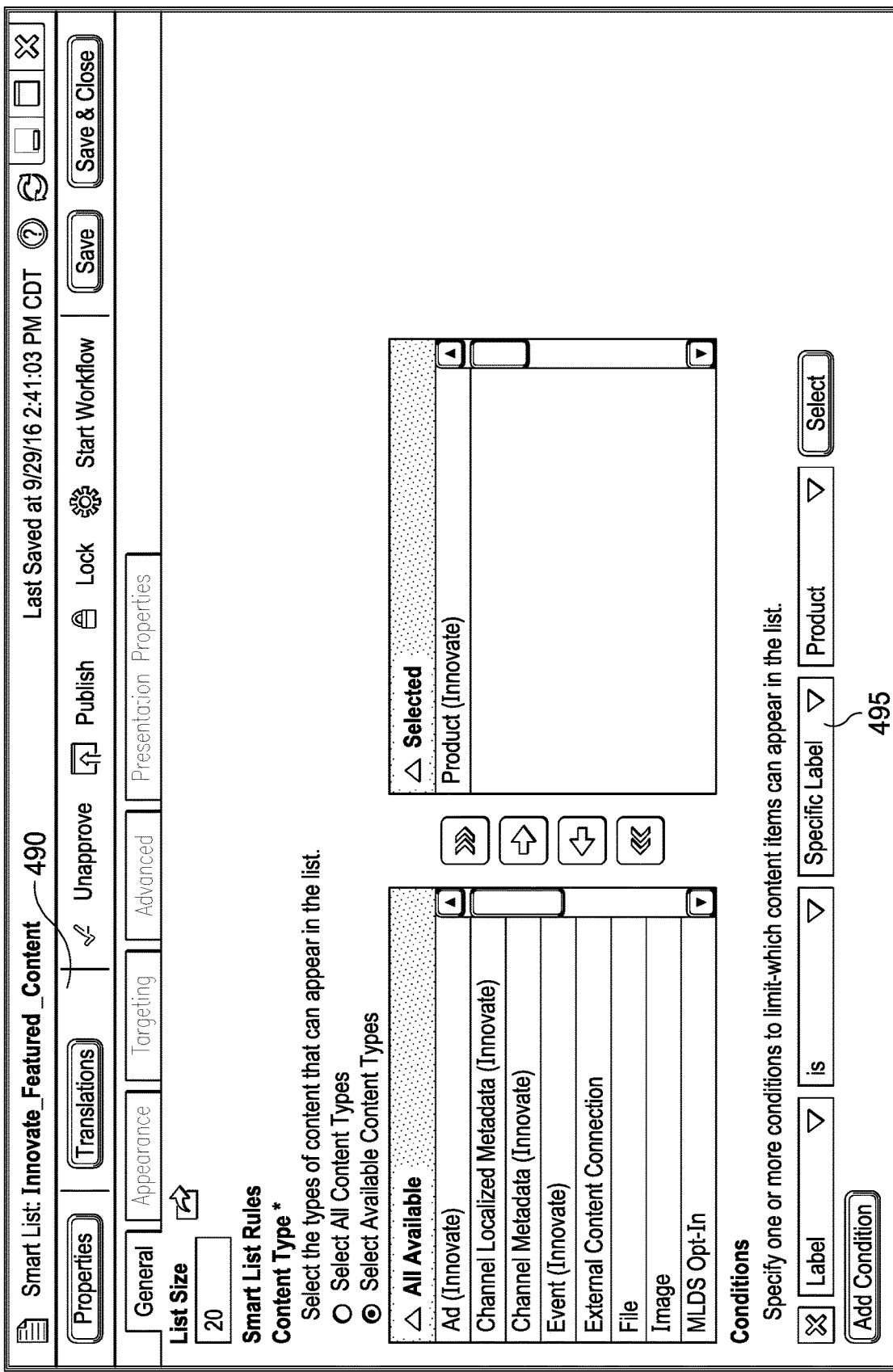

Labels may enhance a number of other website development and deployment processes. FIG. 4H, for example, illustrates an interface 490 that allows a user to define the content items to be represented in a smart list based on a label (as indicated at 495). Interface 490 can be used to define a smart list object that can be provided to delivery stage 150. In this example, delivery stage 150 can provide, as part of a website, a smart list in which content items that are members of a "Product" label appear.

Furthermore, labels can be indexed by search engines (e.g., search engine 134, 172). Users can use the search engine to search for labels. The search facility can be the same as it would be for other managed objects.

Figure 5:
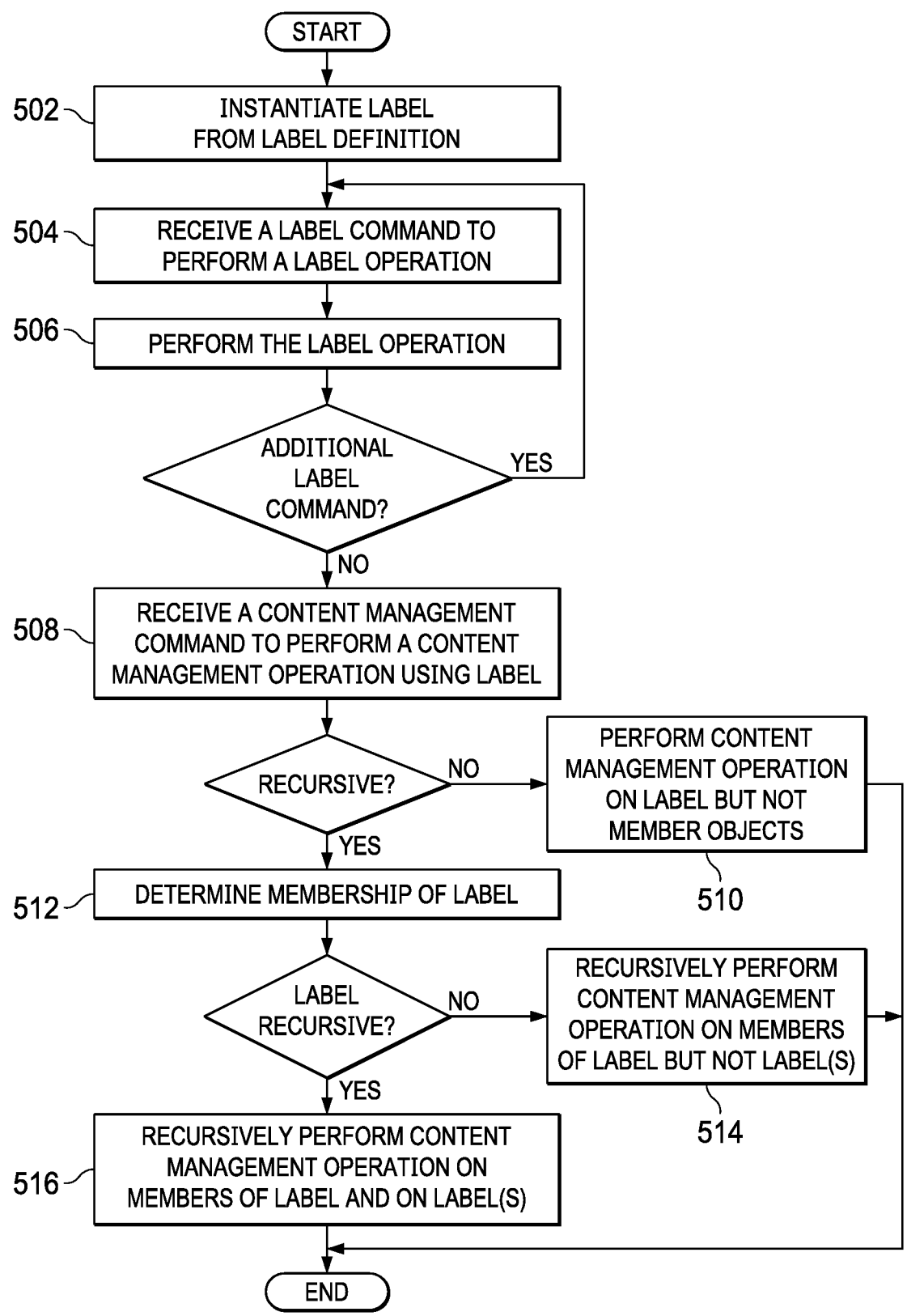
FIG. 5 is a flow chart illustrating one embodiment of using a label to perform a content management operation.

FIG. 5 is a flow chart of one embodiment of a method for managing ad-hoc groups of content. At step 502, a content management system can instantiate a first label from a label definition. According to one embodiment, the content management system creates an instance of a label object having, for example, a name, description, parent label reference, member object references, object label property values, references to aspects and other data properties that define the label. The label may be instantiated based on system generated events or responsive to user interactions.

At steps 504 and 506, the content management system can receive a label command to perform a label operation on the label and perform the label operation on the label. The label command may correspond to a label action defined in the label action framework. For example, the content management system can receive commands to create labels, edit labels, assign content items to labels, remove content items from labels or to perform other label operations. Any number of label operations may be performed. In some embodiments, the label commands correspond to methods defined for the label object. The methods may be called responsive to system generated events or responsive to user interactions.

The content management system, at step 508, can receive a content management command to perform a content management operation on the label. The content management command may correspond to a label action defined in the label action framework. If the operation is classified as "label only" by the label action framework of the content management system, the content management system can perform the content management operation on the label, but not the member objects (step 510). For example, content management system may be configured such that if a user selects to perform a "clone" action on a label, the content management system only clones the label, but does not clone the content objects referenced by the label.

If the operation is classified is classified as recursive by the label action framework, the content management system may determine the membership of the label (step 512). This can include determining the effective membership of the first label. For example, if a member of the first label is itself a label (a second label), the effective membership of the first label may include the members of the second label. Similarly, if a third label is a member of the second label, the effective membership of the first label includes the members of the third label, and so on.

For a "recursive only" operation, the content management system can perform the content management operation on all non-label members in the effective membership of the (first) label, but not the first label or labels that are members of the first label (e.g., the second label and third label in the example above) (step 514). For example, a content management system may be configured such that if a user selects to perform a "translate" action on a label, the translate action is only performed on the non-label members of the label.

For a "label recursive" operation, the content management system can perform the operation on the first label and the entire effective membership of the first label (step 516). For example, a content management system may be configured such that if a user selects to perform a "delete" action on the first label, both the first label and all objects in the effective membership of the first label are deleted.

The steps of FIG. 5 can be repeated as needed or desired and performed in different orders. Substitute steps can be implemented and steps added or omitted.

Other mechanisms for defining groups of content are possible. For example, content items may be part of a content group, such as a translation group, in which membership in the content group is defined in the member objects. Assigning the same content group identifier to multiple content items establishes a content group. Content items in the content group may be added or removed at any time. Applied to multiple instances of the same content type, each member of the content group represents content configured for a specific feature. For example, each member of a translation group represents content configured for a specific locale or language. In a more particular example, content items in a content group may include English, French and German versions of an article. The content group represents a composite content item (e.g., the translation group represents a composite, multilingual content item). Meanwhile, each of its members remains a content item fully capable of an independent life-cycle. U.S. patent application Ser. No. 14/153,863, titled "System and Method for Selective Activation of Site Features," and U.S. patent application Ser. No. 13/780,329, titled "System, Method and Computer Program Product for Multilingual Content Management," both of which are fully incorporated by reference herein in their entireties for all purposes, describe embodiments of content groups including translation groups.

When a user changes one of the content items in a content group other items in the content group may also have to be changed. For example, when an item is translation group is changed with updated content, the updated content may need to be translated for the other translations in the translation group. Labels can provide a flexible solution for managing changes in a content group such as a translation group.

Using the previous example of an article having English, French and German translations, if a content contributor updates the English language version of the article, the French and German translations may be considered translation stale. When such a change is needed to a content item, the content item can be referred to as "translation stale" and the translation group can be designated as "translation pending". Propagating an update throughout a translation group can include translating the content of the source content item (e.g., the English language content item) and updating the respective other translations in the content group (e.g., the translation stale French and German translations). A content management system can use translation stale labels to track the translation status of content items in a translation group.

According to one embodiment, a content management system can track source content items and translation stale content items in a content group. In some embodiments, the source content item in a translation group may be set by default under the assumption that a user, by convention, will always use a specific language to make updates. In other embodiments, the content management system can detect an update to content item and designate that content item as the source. Regardless of how the source content item is determined or designated, the content management system can be configured such that there is only a single source content item in a translation group when the translation group is in a translation pending state. The other content items in the translation group can be locked from editing when the content group is translation pending or changes to the other content items can be disregarded. This can prevent inconsistent updates being made to different translations. However, iterative translations may be made to the same source.

In one embodiment, any change to a source content item in a translation group will result in the other content items becoming translation stale. In another embodiment, the content management system can automatically determine which changes should render the other content items in the translation group translation stale. For example, a content contributor (or other user with appropriate permissions) may designate particular attributes of a content item as translatable (e.g., a content contributor may designate the body and title of an article as translatable). A change to a translatable attribute (e.g., body, title) will result in other content items in the translation group becoming translation stale whereas changes to other attributes will not. In yet another embodiment, the interface provided by the content management system can allow a user to indicate if a change to a content item in a translation group renders the other content items translation stale.

Figure 6A:
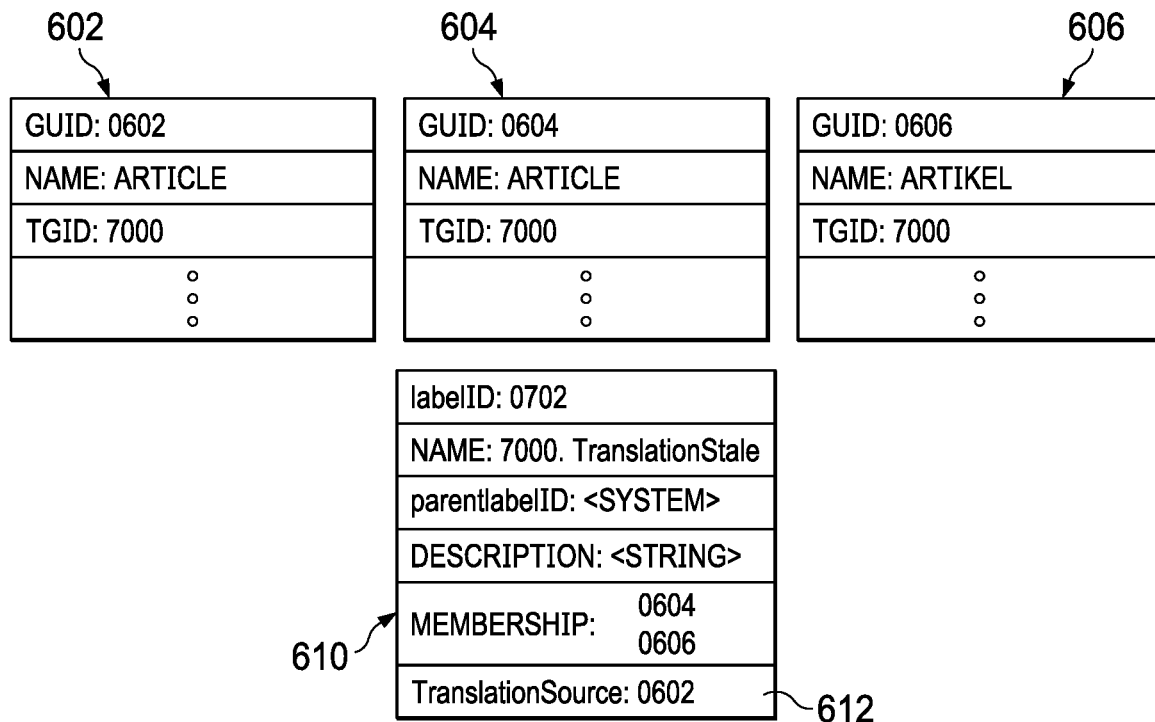
FIGS. 6A-6C illustrates one embodiment of managing translations using objects.

In one embodiment, the translation stale label object is associated with a TranslationStale aspect so that translation stale labels may be easily located. The TranslationStale aspect can define a "TranslationSource" property for the translation stale object. FIGS. 6A are diagrammatic representations illustrating one embodiment of managing translations using labels. In FIG. 6A, content items 602, 604 and 606 are members of a translation group as indicated by the translation group ID 7000 in each of the content items. The content management system can be configured such that when an update requiring translation is committed to a content item that is part of a translation group, the content management system can add the other members of the translation group to a translation stale label for the translation group (e.g., <TranslationGroupGuid>.TranslationStale). The source translation can be tracked by the TranslationSource property defined by the TranslationStale aspect. Thus, for example, if a change is made to the content represented by content object 602, the content management system can insert the object id for content object 602 as the value for the TranslationStale property 612 and content objects 604, 606 can be added to the membership of label 610.

When the translation stale label contains any members of the translation group, the translation group can be considered translation pending. When the translation group is translation pending, the content management system can disallow additional changes requiring translation to content items other than the source content item (e.g., source content item 602). However, in some embodiments, the content management system may continue to allow changes to the source content item. According to one embodiment, the content management system (e.g., content management server 128) may be configured to integrate with translation service providers to automatically send content items for translation. The content management system can use the translation stale label (e.g., translation stale label 610) to identify content items that require translation and send the content items to the translation provider. The integration may also be invoked from other areas, such as through an interface provided by content workspaces 124. In some embodiments, the content management system may provide an interface through which a user can manually enter or upload a translation and change the status of the content item.

Figure 6B:
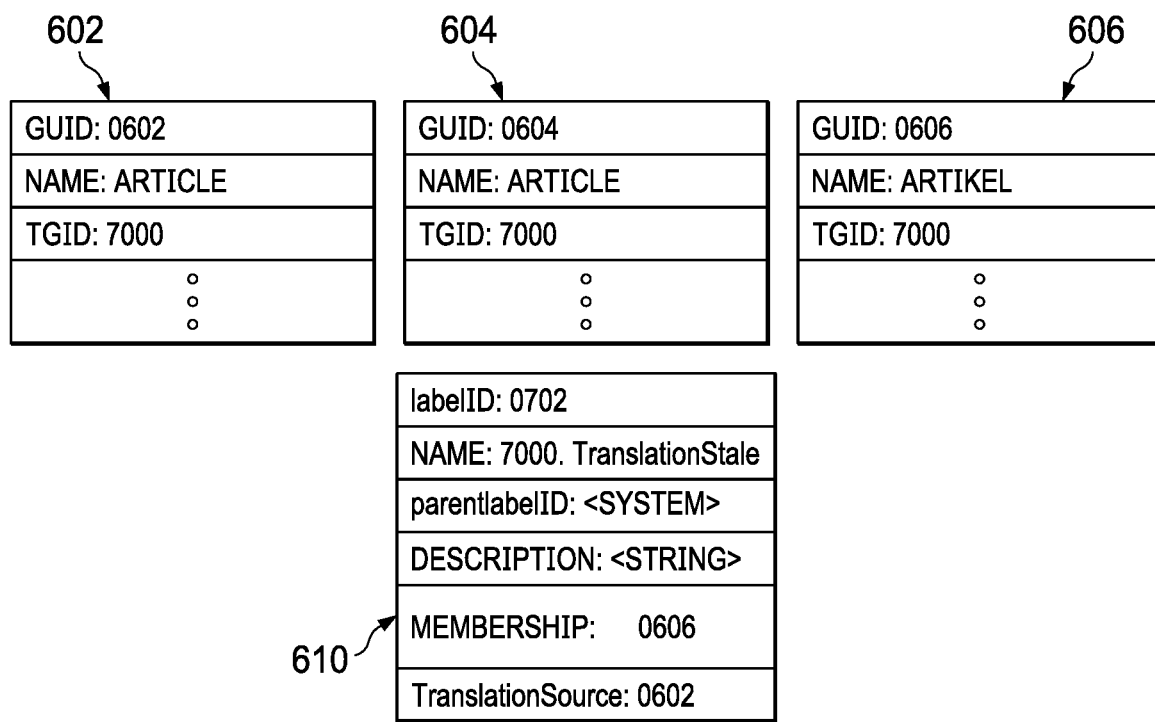

When a translation is returned and a content item updated, the content management system can remove the content item from the translation stale label. For example, in FIG. 6B the content management system removed content object 604 as a member from translation stale label 610. In this example, the translation group is still considered translation pending because content object 606 is still a member of label 610. If a subsequent change requiring translation is made to the source content item while the translation group is considered translation pending, content object 604 can be added back into the membership of translation stale label 610.

Figure 6C:
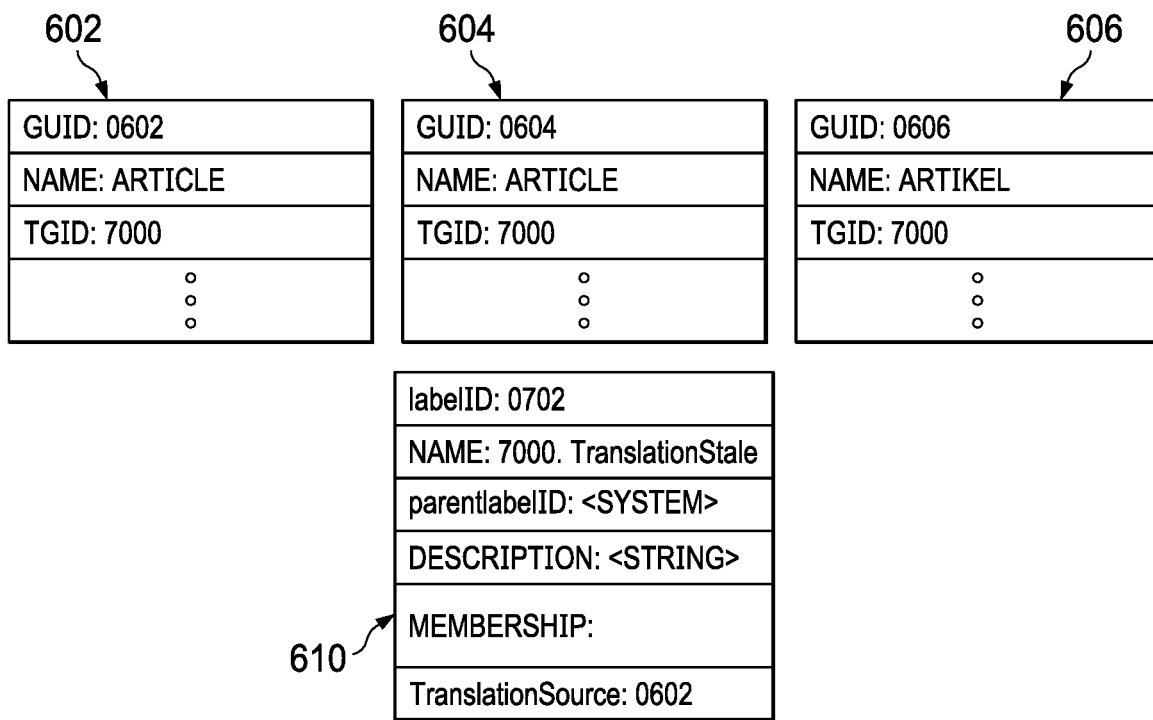

When the up to date translations of all the non-source content items in the translation group have been received, the membership of translation stale label 610 will be empty as shown in FIG. 6C, indicating that the translation group is no longer translation pending. Translation stale label 610 can be deleted.

It can also be noted that the content management system may give the user the option to change the status of a content item to remove the content item from the translation stale label 610. For example, a user may make a change to the source content item, but determine that another content item does not need to be updated. The content management system may provide the option for the user to remove the translation stale status of a content item.

Figure 7:
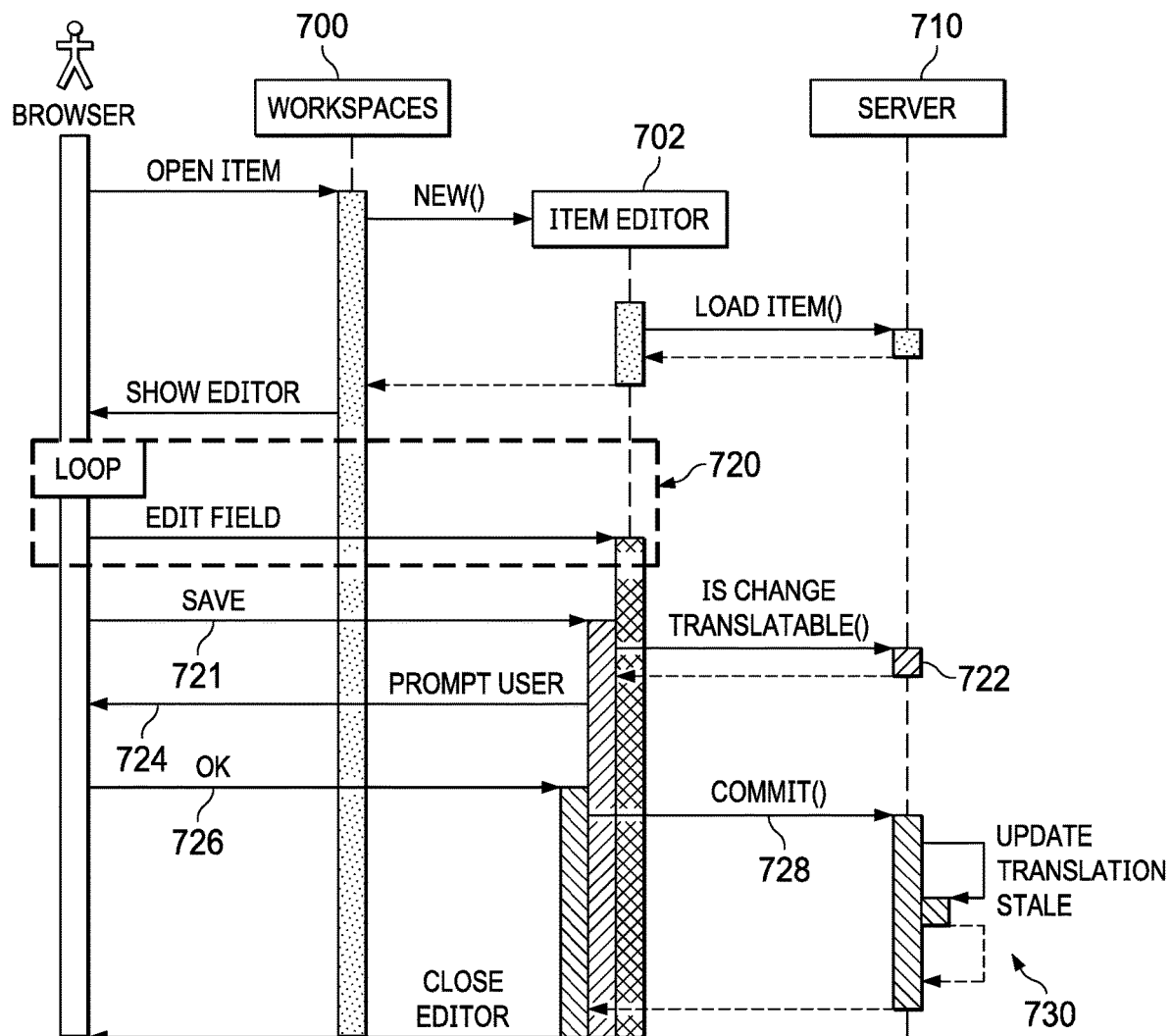
FIG. 7 illustrates one embodiment of a user using a browser to interact with a content management system to update a content item in a translation group.
Figure 8:
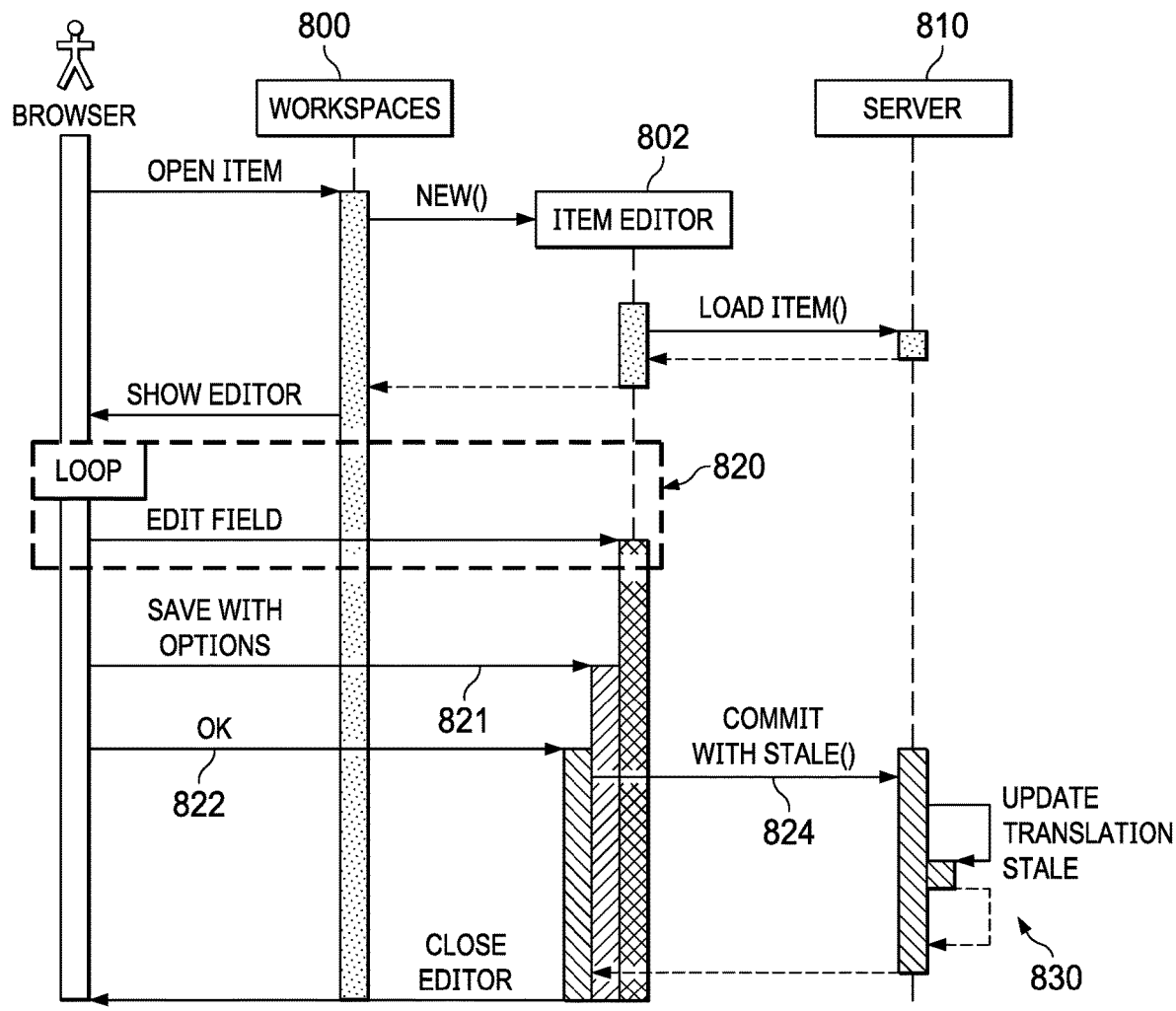
FIG. 8 illustrates another embodiment of a user using a browser to interact with a content management system to update a content item in a translation group.
Figure 9:
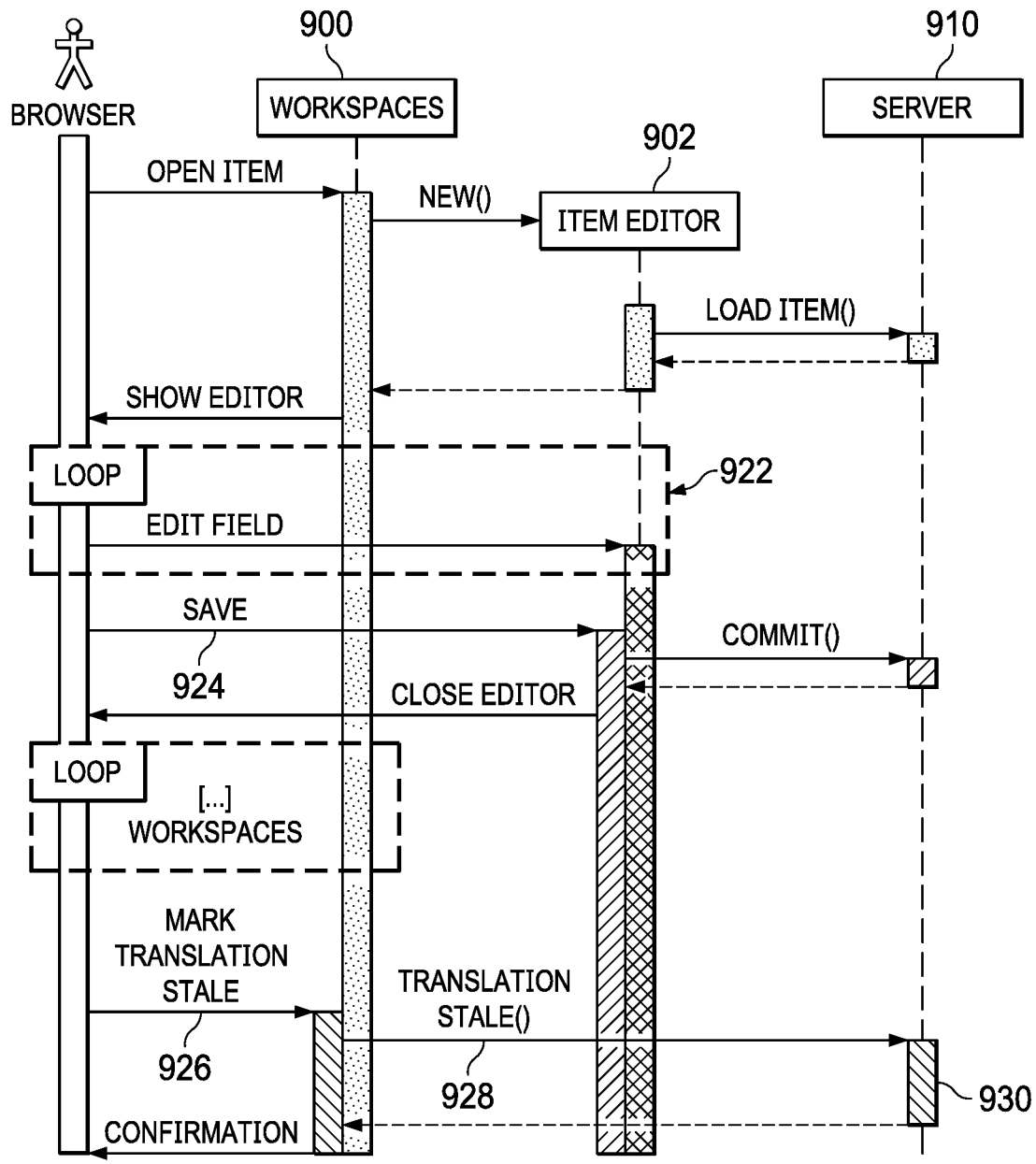
FIG. 9 illustrates yet another embodiment of a user using a browser to interact with a content management system to update a content item in a translation group.

FIGS. 7-9 illustrate different embodiments of a user using a browser to interact with a content management system to update a content item in a translation group. The content management system includes content workspaces 700, 800, 900 (e.g., which can be content workspaces 124 of FIG. 1) that provide access to an item editor 702, 802, 902 for editing content managed by a content management server 710, 810, 910 (e.g., content management server 128 of FIG. 1).

In FIG. 7, the user may edit a content item (indicated at 720) and save the changes (indicated at 721). Saving the changes here indicates that the changes are stored by item editor 702 but are not yet committed to content management server 710. However, in response to an input to save the changes, item editor 702 communicates an "is change translatable" request to content management server 710 to determine if the change is translatable such that it would render other content items translation stale. Content management server 710 determines if the change requires translation (step 722). For example, content management server 710 can determine if the content item is a member of a translation group and, in some cases, if the edited fields of the content item are designated as translatable. If the change requires translation, the content management system can prompt the user to determine if the user wishes to commit the changes to content management server 710 (step 724). If the user requests to commit the changes (indicated at 726), item editor 702 sends a "commit" request with the changes to content management server 710 (step 728). Content management server 710 can commit the change and update the translation state by adding the non-source members of the content group to a translation stale label for that group (step 730). The source member is also tracked (e.g., by content management server 710 adding the source to a property of the translation stale label).

In FIG. 8, the user may edit the content item (indicated at 820) and save the changes with options (step 821), including whether the change should render other members of the translation group translation stale. The user may then select commit the changes (indicated at 822). On receiving a request to commit, item editor 802 can send a "commit with stale( )" request to content management server 810 (step 824) that provides the updated content and an indication to mark translations as stale. Content management server 810 can commit the change and mark content items in the content group as translation stale by adding the non-source members of the content group to a translation stale label for that group (step 830). The source member is also tracked (e.g., by content management server 810 adding the source to a property of the translation stale label).

In FIG. 9, the user may edit the content item (step 922) and save the changes to content item (step 924). In this case, saving the changes at item editor commits the changes to content management server 910. The user interface provided by content workspaces 900 can provide a separate action to allow the user to mark translations stale. In response to a user input to mark a translation stale (indicated at 926), content workspaces 900 can forward a translation stale request (indicated at 928) to the content management server 910. Content management server 910 can add the appropriate content item(s) to a translation stale label for the translation group (step 930). The source member is also tracked (e.g., by content management server 910 adding the source to a property of the translation stale label).

As discussed above, labels may be implemented as managed objects in a content management system, such as according to the hierarchy of FIG. 10. According to one embodiment, content management system comprises an ObjectLabel Class that extends a ManagedObject class. FIGS. 11A-11O (collectively FIG. 11) illustrate an example of one embodiment of an ObjectLabel Class. In this example, the ObjectLabel class is the primary class for defining and access ObjectLabel objects. ObjectLabel instances contain data properties to define labels that can be used to group arbitrary selections of managed objects.

For additional context, in the example of FIG. 11, references to ManagedObject objects can generally be represented by ManagedObjectRef instances. However, in-memory references to ObjectLabel objects can be represented by ObjectLabelRef instances, which may be a specialized type of ManagedObjectRef specifically for ObjectLabel references.

FIG. 11A provides a table with an example of a nested class summary for one embodiment of an ObjectLabelClass. FIG. 11B provides a table with example fields of one embodiment of an ObjectLabel Class. FIG. 11C illustrates an example constructor name. FIGS. 11D-11N illustrates example methods of one embodiment of ObjectLabel Class.

An OjectLabelData object class can represent the data for an ObjectLabel object. ObjectLabel instances contain various data properties that define an object label including name, a description, a parent label, member object references, object label property values and localized data.

FIGS. 12A-12J (collectively FIG. 12) illustrate an example of one embodiment ObjectLabelData Class. FIG. 12A provides a table with an example of a nested class summary for one embodiment of an ObjectLabelData Class. FIGS. 12B and 12C provide a table with example fields of one embodiment of an ObjectLabel Class. FIG. 12D illustrates an example constructor name. FIGS. 12E-12M illustrates example methods of one embodiment of ObjectLabelData Class.

Further as discussed above, various aspects for labels can be defined (e.g., LabelAccess, TranslationStale). As another example, an ActionLabel aspect can be defined. Labels of this aspect are system labels for actions and can act as a durable queue for actions, which may run in the background. The system can leverage action labels to store the set of members on which the action needs to be performed. These labels can be put in the System domain. The system can manipulate the set of members as the action is performed on each member. The action labels can also allow the system to identify if a given managed object is included in a background process. For example, if a managed object is undergoing translation, a user may not want to make changes until the translation is complete.

When an action is initiated by a user, the user may specify a set of inputs that includes a set of managed objects on which to run the action. It can be noted that if the user specifies an action on a label, the set of managed objects may include the label, members of the label, nested labels or members of nested labels as defined by the label action framework. Based on the user's selections, the action framework creates a new action label that is initialized with the members on which the action should be performed. This membership may grow or shrink as the action is performed on each member or new members are added.

Aspects extend the flexibility and control provided by labels. For example, as new queuing and tracking functionality is required, new aspects can be defined that can be implemented through the labels rather than creating an entirely new distinct queuing and tracking implementations.

According to one embodiment, a content management system may comprise an ObjectLabelAspect interface. The ObjectLabelAspect interface may be implemented by all aspects defined for ObjectLabel instances. An ObjectLabel aspect is a construct for defining a specialized behavior for labels. Implementing an aspect using ObjectLabel aspects can be analogous, in some implementations, to using a subclass, or extending class, of a Java class, but with the added ability of being able to add multiple aspects to individual ObjectLabel instances.

One example use of are aspect is to specify a well-defined set of ObjectLabel properties that can conveniently access through the aspect implementation class, rather than being accessed through a generic and potentially less convenient ObjectLabel property API. Aspects, however, are not limited to managing label properties. An aspect can be used to define any specialized behavior to be provided to a given class of label objects.

In addition to implanting the ObjectLabelAspect interface, ObjectLabel aspect classes may have to adhere to a special set of requirements. When an aspect class is specified to an ObjectLabel API, it can be validated to confirm that it meets these requirements. According to one embodiment:
  a. The aspect class implements the ObjectLabelAspect interface;
  b. The aspect class defines a nested aspect factory class with a class name specified according to a predetermined rule (e.g., specified according to ASPECT_FACTORY_CLASS_NAME).
  c. The aspect factory class implements a particular interface (e.g., ObjectLabelAspect.ObjectLabelAspectFactory).
  d. The aspect factory class is declared as static.
  e. The aspect factory class is declared as protected.

f. The aspect factory class is not declared as an interface.

g. The aspect factory class is not declared as abstract.

h. The aspect factory class defines a public default constructor.

i. The aspect factory class is typed based on the aspect class.

According to one embodiment, an ObjectLabel aspect classes can be implemented by extending an AbstractObjectLabelAspect class. AbstractObjectLabelAspect can be designed with the expectation that ObjectLabel aspects are primarily used to manage well defined sets of ObjectLabel properties and, therefore, includes a variety of convenience methods to simplify managing such properties. Aspect classes may be defined in other manners as well.

Aspects can be added to and removed from individual label object instances using defined methods. Once an aspect is added to an instance, the label can then be accessed as an instance of the aspect using a defined method (e.g., ObjectLabel.getAsAspect (Class) method). A label API client can also determine if a label instance currently has a given aspect using a defined method (e.g., ObjectLabel.hasAspect (Class)).

According to some embodiments, an aspect may have the ability to reject being added to a given label instance. For example, an aspect implementation may determine the state of a given label object instance is not compatible with the aspect definition. Acceptance or rejection of an aspect being added to give a label instance may be handled through a defined aspect support method (e.g., ObjectLabelAspect.ObjectLabelAspectFactory.supportsAspect (ObjectLabel) implemented by the aspect factory class). When a caller attempts to add a label, the aspect support method can be called before the aspect is added and if the aspect factory reports that the label does not support the aspect, then then the operation to add the aspect fails. Thus, a label API client can determine if a given label supports an aspect by attempting to add the aspect.

FIGS. 13A-13C (collectively FIG. 13) illustrate an example of one embodiment of an ObjectLabelAspect Class. FIG. 13A provides a table with an example of a nested class summary for one embodiment of an ObjectLabelAspect class. FIG. 13B provides a table with example fields of one embodiment of an ObjectLabelAspect Class. FIG. 13C illustrates example methods of one embodiment of an ObjectLabelAspect Class.

Although the invention has been described with respect to specific embodiments thereof, these embodiments are merely illustrative, and not restrictive of the invention as a whole. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

As used herein, a term preceded by "a" or "an" (and "the" when antecedent basis is "a" or "an") includes both singular and plural of such term unless the context clearly dictates otherwise. Also, as used in the description herein, the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

As one skilled in the art can appreciate, a computer program product implementing an embodiment disclosed herein may comprise one or more non-transitory computer readable media storing computer instructions translatable by one or more processors in a computing environment. ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Data may be stored in a single storage medium or distributed through multiple storage mediums, and may reside in a single database or multiple databases (or other data storage techniques).

Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines.

Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

What is claimed is:

1. A data processing system comprising:
a computer comprising a content management system; and
a data store storing content items for the content management system,
the content management system configured to:
receive a change to a source content item that is part of a translation group, the change indicated as a translatable change;
based on receiving the change to the source content item:
add a reference to the source content item to a label object and designate the source content item as a source translation using the label object to track the source translation via the label object, the label object comprising label object behaviors and label objects properties;
determine that the source content item is a member of the translation group;
determine a set of corresponding content items to assign to the label object based on membership in the translation group, the set of corresponding content items corresponding to different stale multilingual translations of the source content item; and
assign the set of corresponding content items to the label object as members of the label object to track a translation state of the set of corresponding content items via the label object;
remove a corresponding content item from the label object in response to an input indicating that the corresponding content item should be removed; and
prevent changes that require multilingual translation of content to content items in the set of corresponding content items while any content item in the set of corresponding content items is a member of the label object by locking from editing the content items in the set of corresponding content items, wherein the label object is a separately managed object from the source content item and the corresponding content items.

2. The data processing system of claim 1, wherein the content management system is further configured to prevent additional changes to the source content item that require translation while any content item in the set of corresponding content items is a member of the label object.

3. The data processing system of claim 1, wherein the content items are managed as content objects and wherein the content management system is configured to determine that the source content item is a member of the translation group from a content object property for the source content item.

4. The data processing system of claim 1, wherein the content management system is configured to identity that the set of corresponding content items require translation from the label object and send the corresponding set of content items to a translation provider.

5. The data processing system of claim 1, wherein the input indicating that the corresponding content item should be removed from the label object comprises an updated translation of the corresponding content item.

6. The data processing system of claim 1, wherein the content management system is further configured to add previously removed corresponding content items back to the label object in response to receiving a new change to the source content item, wherein the new change is indicated as a new translatable change.

7. The data processing system of claim 1, wherein the content management system is configured to delete the label object when all of the set of corresponding content items have been removed from the membership of the label object.

8. The data processing system of claim 1, wherein tracking the source translation and assigning the set of corresponding content items to the label object comprises updating the label object with references to content object identifications for a source content object for the source content item and content objects for the set of corresponding content items.

9. The data processing system of claim 8, wherein the source content object and the content objects for the set of corresponding content items comprise content object properties having values and the content management system is configured to track the source content object using the label object and assign the set of corresponding content items to the label object without changing the values of the of the content object properties.

10. The data processing system of claim 1, wherein the label object references an aspect that provides a property and behavior to track the source content item.

11. The data processing system of claim 1, wherein the content management system is further configured to receive a content management command and perform a content management operation in response to the content management command, the content management command comprising a translate command and the content management operation comprising sending the set of corresponding content items that are members of the label object to a translation provider computer system.

12. The data processing system of claim 1, wherein the content management system is configured to synchronize multilingual content translations of content items of a multilingual website.

13. A computer program product comprising a non-transitory computer readable medium storing a set of instructions executable by a processor, the set of instructions comprising instructions executable to:
receive a change to a source content item that is part of a translation group managed by a content management system, the change indicated as a translatable change;
based on receiving the change to the source content item:
add a reference to the source content item to a label object and designate the source content item as a source translation using the label object to track the source translation via the label object, the label object comprising label object behaviors and label objects properties;
determine that the source content item is a member of the translation group;
determine a set of corresponding content items managed by the content management system to assign to the label object based on membership in the translation group, the set of corresponding content items corresponding to different stale multilingual translations of the source content item; and
assign the set of corresponding content items to the label object as members of the label object to track a translation state of the set of corresponding content items via the label object;
remove a corresponding content item from the label object in response to an input indicating that the corresponding content item should be removed; and
prevent changes that require multilingual translation of content to content items in the set of corresponding content items while any content item in the set of corresponding content items is a member of the label object by locking from editing the content items in the set of corresponding content items, wherein the label object is a separately managed object from the source content item and the corresponding content items.

14. The computer program product of claim 13, wherein the content management system is further configured to prevent additional changes to the source content item that require translation while any content item in the set of corresponding content items is a member of the label object.

15. The computer program product of claim 13, wherein the content items are managed as content objects and wherein the set of instructions comprise instructions executable to determine that the source content item is a member of the translation group from a content object property for the source content item.

16. The computer program product of claim 13, wherein the set of instructions comprise instructions executable to identify that the set of corresponding content items require translation from the label object and send the corresponding set of content items to a translation provider.

17. The computer program product of claim 13, wherein the input indicating that the corresponding content item should be removed from the label object comprises an updated translation of the corresponding content item.

18. The computer program product of claim 13, wherein the set of instructions further comprise instructions executable to add previously removed corresponding content items back to the label object in response to receiving a new change to the source content item, wherein the new change is indicated as a new translatable change.

19. The computer program product of claim 13, wherein the set of instructions further comprise instructions configured to delete the label object when all of the set of corresponding content items have been removed from the membership of the label object.

20. The computer program product of claim 13, wherein tracking the source translation and assigning the set of corresponding content items to the label object comprises updating the label object with references to content object identifications for a source content object for the source content item and content objects for the set of corresponding content items.

21. The computer program product of claim 20, wherein the source content object and the content objects for the set of corresponding content items comprise content object properties having values and the set of instructions further comprise instructions executable to track the source content object and assign the set of corresponding content items to the label object without changing the values of the of the content object properties.

22. The computer program product of claim 13, wherein the label object references an aspect that provides a property and behavior to track the source content item.

23. The computer program product of claim 13, wherein the set of instructions further comprise instructions executable to receive a content management command and perform a content management operation in response to the content management command, the content management command comprising a translate command and the content management operation comprising sending the set of corresponding content items that are members of the label object to a translation provider computer system.

24. The computer program product of claim 13, wherein the set of instructions comprises instructions executable to synchronize multilingual content translations of content items of a multilingual website.

\* \* \* \* \*

UNITED STATES PATENT AND TRADEMARK OFFICE
CERTIFICATE OF CORRECTION

PATENT NO. : 10,685,006 B2
APPLICATION NO. : 15/789698
DATED : June 16, 2020
INVENTOR(S) : Michael Gerard Jaskiewicz et al.

It is certified that error appears in the above-identified patent and that said Letters Patent is hereby corrected as shown below:

In the Claims

Claim 4:
Column 27, Line 2, replace "identity" with "identify"

Signed and Sealed this
Eighth Day of September, 2020

Andrei Iancu
*Director of the United States Patent and Trademark Office*